(12) United States Patent
Kim et al.

(10) Patent No.: US 11,932,549 B2
(45) Date of Patent: Mar. 19, 2024

(54) MANUFACTURING APPARATUS FOR LITHIUM SULFATE AND MANUFACTURING METHOD THEREFOR

(71) Applicants: POSCO, Pohang-si (KR); RESEARCH INSTITUTE OF INDUSTRIAL SCIENCE & TECHNOLOGY, Pohang-si (KR)

(72) Inventors: Juyoung Kim, Pohang-si (KR); Ki Young Kim, Pohang-si (KR); Woonkyoung Park, Pohang-si (KR); Jung Kwan Park, Pohang-si (KR); Woo Chul Jung, Pohang-si (KR); Kwang Seok Park, Pohang-si (KR); Hyun Woo Lee, Pohang-si (KR); Sang Won Kim, Pohang-si (KR); Heok Yang, Pohang-si (KR); Seung Taek Kuk, Pohang-si (KR)

(73) Assignees: POSCO CO., LTD, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 445 days.

(21) Appl. No.: 17/265,371

(22) PCT Filed: Aug. 2, 2019

(86) PCT No.: PCT/KR2019/009676
§ 371 (c)(1),
(2) Date: Feb. 2, 2021

(87) PCT Pub. No.: WO2020/027625
PCT Pub. Date: Feb. 6, 2020

(65) Prior Publication Data
US 2021/0300774 A1     Sep. 30, 2021

(30) Foreign Application Priority Data

Sep. 28, 2018  (KR) .................. 10-2018-0116489
Aug. 2, 2019   (KR) .................. 10-2018-0090311

(51) Int. Cl.
*C01D 15/06*   (2006.01)
*B01J 8/00*    (2006.01)
*B01J 19/00*   (2006.01)

(52) U.S. Cl.
CPC .............. *C01D 15/06* (2013.01); *B01J 8/006* (2013.01); *B01J 19/0066* (2013.01);
(Continued)

(58) Field of Classification Search
CPC ....... C01D 15/06; B01J 8/006; B01J 19/0066; B01J 2208/00867; B01J 2208/00902;
(Continued)

(56) References Cited

U.S. PATENT DOCUMENTS 2,608,465 A * 8/1952 May .................. C01D 15/06
                                                    23/302 R

FOREIGN PATENT DOCUMENTS

JP    2008-261743 A    10/2008
JP    2011-168858 A    9/2011
(Continued)

OTHER PUBLICATIONS

Japanese Office Action dated May 10, 2022 issued in Japanese Patent Application No. 2021-505862.
(Continued)

*Primary Examiner* — Timothy C Vanoy
(74) *Attorney, Agent, or Firm* — Morgan, Lewis & Bockius LLP

(57) ABSTRACT

It is introduced that a device of manufacturing lithium sulfate comprising: a reaction body in which a reaction of
(Continued)

lithium phosphate and sulfuric acid is performed, the reaction body being divided into an upper space and a lower space; a pressurizer for applying pressure to the inside of the reaction body; a stirrer disposed in the upper space for stirring the lithium phosphate and sulfuric acid to produce a mixture containing lithium sulfate and phosphoric acid; and a filter disposed inside the reaction body and separating the filtrate containing the phosphoric acid into the lower space by filtering the mixture.

20 Claims, 13 Drawing Sheets

(52) U.S. Cl.
CPC ............... *B01J 2208/00867* (2013.01); *B01J 2208/00902* (2013.01); *C01P 2006/80* (2013.01)

(58) Field of Classification Search
CPC ...... B01J 2219/00745; B01J 2219/0075; B01J 2219/00889; B01J 2219/089; C01P 2006/80
See application file for complete search history.

(56) References Cited

FOREIGN PATENT DOCUMENTS

| | | |
|---|---|---|
| KR | 10-1996-7000792 A | 2/1996 |
| KR | 10-2002-0003521 A | 1/2002 |
| KR | 10-0461564 B1 | 12/2004 |
| KR | 10-1092625 B1 | 12/2011 |
| KR | 10-2012-0084460 A | 7/2012 |
| KR | 10-1284072 B1 | 7/2013 |
| KR | 10-1284702 B1 | 7/2013 |
| KR | 10-1402899 B1 | 6/2014 |
| KR | 10-2014-0144381 A | 12/2014 |
| KR | 10-2016-0002579 A | 1/2016 |
| KR | 10-1716623 B1 | 3/2017 |
| KR | 10-1798998 B1 | 11/2017 |
| KR | 10-1803380 B1 | 12/2017 |
| KR | 10-2018-0039303 A | 4/2018 |
| KR | 10-2018-0039587 A | 4/2018 |
| KR | 10-2018-0074855 A | 7/2018 |
| KR | 10-1887173 B1 | 8/2018 |
| KR | 10-1975467 B1 | 5/2019 |
| WO | 94/17892 A | 8/1994 |
| WO | 98/09702 A1 | 3/1998 |
| WO | 2018/070726 A1 | 4/2018 |

OTHER PUBLICATIONS

D. Qisheng, et al., "New Practical Filtration Technology," Metallurgical Industry Press, Jan. 31, 2000 & its English Abstract.
Chinese Decision on Rejection dated Jul. 23, 2023 issued in Chinese Patent Application No. 201980065570.X.
International Written Opinion and Search Report dated Nov. 15, 2019 issued in International Patent Application No. PCT/KR2019/009676 (partial English translation).
Extended European Search Report dated Sep. 1, 2021 issued in European Patent Application No. 19843616.4.

* cited by examiner

FIG. 9 <LP-LS Automation of conversion process flow>

MANUFACTURING APPARATUS FOR LITHIUM SULFATE AND MANUFACTURING METHOD THEREFOR

CROSS-REFERENCE OF RELATED APPLICATIONS

This application is the U.S. National Phase under 35 U.S.C. § 371 of International Patent Application No. PCT/KR2019/009676, filed on Aug. 2, 2019, which in turn claims the benefit of Korean Application Nos. 10-2018-0090311, filed on Aug. 2, 2018 and 10-2018-0116489, filed on Sep. 28, 2018, the entire disclosures of which applications are incorporated by reference herein.

TECHNICAL FIELD

The present invention relates to a device for producing lithium sulfate and a method for producing the same. More specifically, the present invention relates to a manufacturing device and a manufacturing method of lithium sulfate capable of extracting lithium sulfate and phosphoric acid of high concentration and low impurity from lithium phosphate.

BACKGROUND

Lithium phosphate is an effective method for extracting lithium directly from the brine or extracting lithium from the waste battery. However, due to the high cost of phosphoric acid, the method of extracting lithium in the form of lithium phosphate should be accompanied by a technology for recovering high concentration of phosphoric acid from the extracted lithium phosphate in order to be economical, and it is necessary to develop efficient process composition and apparatus.

In the conventional process, it is difficult to purify impurities due to the characteristics of lithium sulfate, which is highly soluble in water, as well as problems of process efficiency deterioration, equipment cost and area increase due to repetition of solid-phase and liquid-phase unit processes.

DISCLOSURE

Problem to be Solved

It is provided that a device for manufacturing lithium sulfate capable of extracting lithium sulfate and phosphoric acid of high concentration and low impurity from lithium phosphate and a manufacturing method.

Means for Solving Problem

According to an embodiment of the present invention, there is provided A device of manufacturing lithium sulfate including:
a reaction body in which a reaction of lithium phosphate and sulfuric acid is performed, the reaction body being divided into an upper space and a lower space;
a pressurizer for applying pressure to the inside of the reaction body;
a stirrer disposed in the upper space for stirring the lithium phosphate and sulfuric acid to produce a mixture containing lithium sulfate and phosphoric acid; and
a filter disposed inside the reaction body and separating the filtrate containing the phosphoric acid into the lower space by filtering the mixture.

The device can further include a recovery unit connected to the lower space and collecting the filtrate.

The device can further include:
a cleaning liquid supply unit connected to the upper space and supplying a cleaning liquid into the reaction body; and
a circulation unit for circulating the cleaning liquid passed through the filter from the lower space to the upper space.

The device can further include:
a dissolution liquid supply unit connected to the upper space and supplying a dissolution liquid into the reaction body; and
a obtaining unit for obtaining lithium sulfate dissolved in the dissolution liquid through a resultant pipe connected to the lower space.

The cleaning liquid supply unit can include:
a first reservoir in which the cleaning liquid is stored;
a first supply pipe communicating the first reservoir and the upper space; and
a spray nozzle formed at the end of the first supply pipe.

The cleaning liquid supply unit can further include:
a connection pipe connecting the resultant pipe and the first supply pipe; and
a connection pump installed on the connection pipe.

The circulation unit can include:
a circulation pipe communicating the lower space and the upper space; and
a circulation pump installed on the circulation pipe.

The circulation unit can further include:
a density measuring device installed in the circulation pipe and measuring a density of the cleaning liquid passing through the filter.

The dissolution liquid supply unit can include:
a second reservoir for storing the dissolution liquid; and
a second supply pipe communicating the second reservoir and the upper space.

According to an embodiment of the present invention, there is provided a method for producing lithium sulfate using a reaction vessel divided into an upper space and a lower space, comprising the steps of:
injecting solid phase lithium phosphate and sulfuric acid into the reaction vessel;
stirring the solid lithium phosphate and sulfuric acid in the upper space to produce a mixture comprising lithium sulfate and phosphoric acid; and
pressurizing the interior of the reaction vessel and filtering the mixture to separate the filtrate containing phosphoric acid into the lower space.

After the step of filtering the mixture, the cleaning liquid may be sprayed under pressure in the reaction vessel to simultaneously perform cleaning and filtration of the lithium sulfate.

In the step of spraying the cleaning liquid, the lithium sulfate may be cleaned and the density of the filtrate may be measured to adjust the spray amount of the cleaning liquid according to the density of the filtrate.

In the step of spraying the cleaning liquid, the density of the filtrate can be adjusted to 1.2 to 1.8 g/cc.

In producing the mixture comprising lithium sulfate and phosphoric acid, the mixture is prepared through direct reaction of the solid lithium phosphate and sulfuric acid. The mixture contains a phosphoric acid solution in which sulfate ions are present, and lithium sulfate in the solid phase can be precipitated in the phosphoric acid solution.

In the step of separating the filtrate into the lower space, the total concentration of phosphorus (P) and sulfur (S) in the filtrate may be 5 mol/L or more.

After the step of spraying the cleaning liquid, the method can further include:
injecting the filtrate which is filtered after cleaning lithium sulfate, with the solid lithium phosphate and sulfuric acid into the reaction vessel; and
stirring the filtrate, the solid lithium phosphate and sulfuric acid in the upper space.

After the step of spraying the cleaning liquid, the method can further include:
supplying a dissolution liquid to the cleaned lithium sulfate; and
obtaining lithium sulfate dissolved in the dissolution liquid.

After the step of obtaining lithium sulfate dissolved in the dissolution liquid, the method can further include:
separating the lithium sulfate dissolved in the dissolution liquid and spraying the lithium sulfate together with the cleaning liquid into the lithium sulfate (solid phase).

According to an embodiment of the present invention, there is provided a method of manufacturing lithium sulfate comprising:
introducing solid phase lithium phosphate and sulfuric acid into a reaction vessel;
producing a mixture comprising solid lithium sulfate and phosphoric acid by stirring the solid lithium phosphate and sulfuric acid;
recovering a filtrate comprising the phosphoric acid by pressurizing and filtering the mixture; and
cleaning and filtering the mixture by spraying the cleaning liquid with the mixture being pressurized.

In the step of spraying the cleaning liquid, cleaning and filtering of the mixture may be performed at the same time.

In the step of filtering the mixture, when a liquid content which is the ratio of the liquid in the mixture is 45 to 53% by weight, the spray of the cleaning liquid can be started.

In the step of spraying the cleaning liquid, the cleaning liquid is sprayed so that the liquid content of the mixture is maintained at 45 to 53% by weight.

In the step of filtering the mixture, the mixture can be pressurized to 2 to 4 bar, and
in the step of spraying the cleaning liquid, the mixture can be pressurized to 2 to 4 bar.

The method can further include:
determining that the mixture has been washed by measuring the density of the filtrate filtered from the mixture, if the density of the filtrate becomes 1.51 g/cc or less, after the step of spraying the cleaning liquid.

The method can further include:
terminating the spraying of the cleaning liquid when the density of the filtrate becomes 1.25 g/cc or less, after the step of measuring the density of the filtrate.

The method can further include:
supplying a dissolution liquid to the remained solid lithium sulfate filtered the filtrate from the mixture; and
obtaining lithium sulfate dissolved in the dissolution liquid, after the step of spraying the cleaning liquid.

In the step of filtering the mixture, the total concentration of phosphorus (P) and sulfur (S) in the filtrate may be 5 mol/L or more.

In the step of producing the mixture, the mixture is produced through direct reaction of the solid lithium phosphate and sulfuric acid,
the mixture can include a phosphoric acid solution in which sulfuric acid ions are present, and
the solid lithium sulfate is precipitated in the phosphoric acid solution.

In the step of spraying the cleaning liquid, the total weight of the cleaning liquid to be sprayed is 0.9 to 1.2 times the weight of the solid phase particles contained in the mixture before spraying the cleaning liquid.

Effect

The device for producing lithium sulfate according to an embodiment of the present invention can efficiently perform reaction, stirring and filtration of lithium phosphate and sulfuric acid in one vessel to obtain lithium sulfate and phosphoric acid efficiently.

The process for preparing lithium sulfate according to an embodiment of the present invention can shorten the process time required for filtration and washing and can separate 95% or more of solid particles and liquid without being influenced by the thickness of the mixture of cakes.

DETAILED DESCRIPTION OF THE INVENTION

The terms first, second and third, etc. are used to describe various portions, components, regions, layers and/or sections, but are not limited thereto. These terms are only used to distinguish any moiety, element, region, layer or section from another moiety, moiety, region, layer or section. Thus, a first portion, component, region, layer or section described below may be referred to as a second portion, component, region, layer or section without departing from the scope of the present invention.

The terminology used herein is for the purpose of describing particular embodiments only and is not intended to limit the invention. The singular forms as used herein include plural forms as long as the phrases do not expressly express the opposite meaning thereto. As used herein, the meaning of "comprising" embodies specific features, regions, integers, steps, operations, elements and/or components, and does not exclude the presence or addition of other features, regions, integers, steps, operations, elements and/or components.

When referring to a portion as being "on" or "above" another portion, it may be directly on or over another portion, or may involve another portion therebetween. In contrast, when referring to a part being "directly above" another part, no other part is interposed therebetween.

Unless otherwise defined, all terms including technical and scientific terms used herein have the same meaning as commonly understood by one of ordinary skill in the art to which this invention belongs. Commonly used predefined terms are further interpreted as having a meaning consistent with the relevant technical literature and the present disclosure, and are not to be construed as ideal or very formal meanings unless defined otherwise.

Hereinafter, embodiments of the present invention will be described in detail so that those skilled in the art can easily carry out the present invention. The present invention may, however, be embodied in many different forms and should not be construed as limited to the embodiments set forth herein.

A Device of Manufacturing Lithium Sulfate

Figure 1:
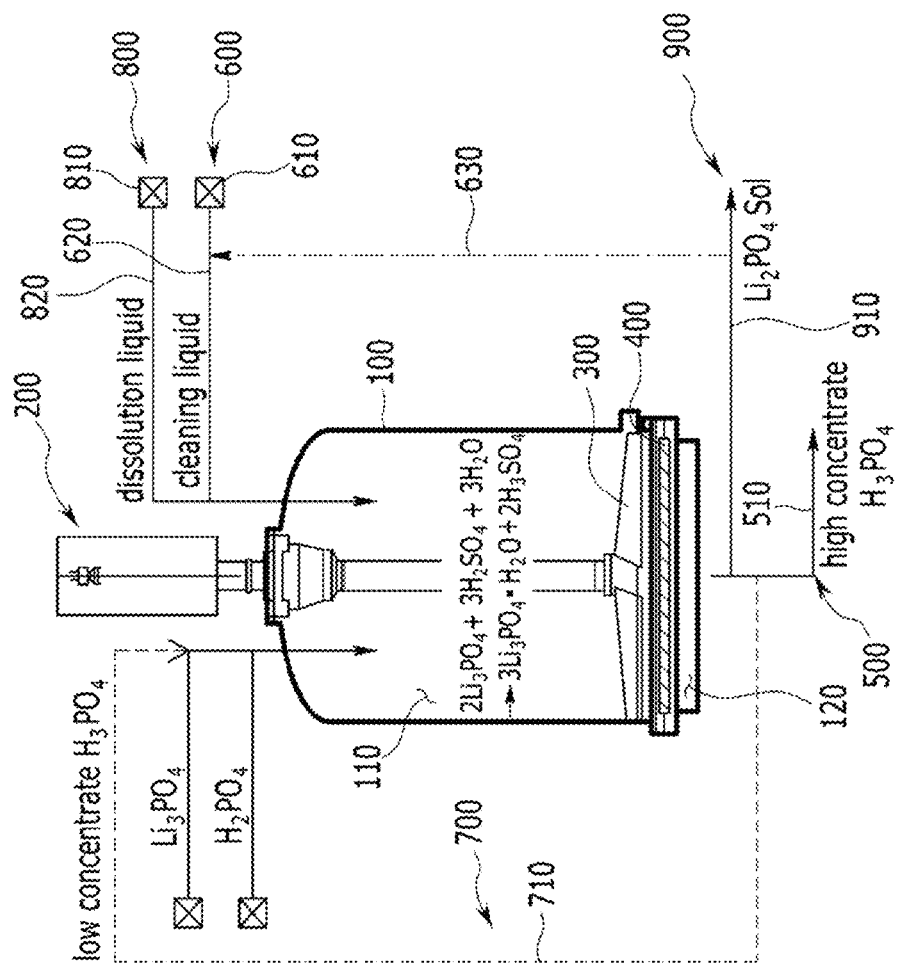
FIG. 1 is a view showing a device for producing lithium sulfate according to an embodiment of the present invention.

Referring FIG. 1, the device for producing lithium sulfate according to an embodiment of the present invention includes a reaction body 100 in which a reaction of lithium phosphate and sulfuric acid is performed, the reaction body being divided into an upper space 110 and a lower space 120; a pressurizer 200 for applying pressure to the inside of the reaction body 100; a stirrer 300 disposed in the upper space for stirring the lithium phosphate and sulfuric acid to produce a mixture containing lithium sulfate and phosphoric acid; and a filter 400 disposed inside the reaction body and separating the filtrate containing the phosphoric acid into the lower space 120 by filtering the mixture.

The reaction body 100 may be formed as a case having a space therein. Reaction of lithium phosphate and sulfuric acid takes place in the inner space of the reaction body 100.

The upper part of the reaction body 100 may be connected to the lithium phosphate supply unit to supply lithium phosphate to the reaction body 100. The lithium phosphate supply unit may include a lithium phosphate reservoir and a lithium phosphate supply pipe.

In addition, the upper part of the reaction body 100 may be connected to the sulfuric acid supply unit to supply sulfuric acid to the reaction main body 100. The sulfuric acid supply unit may comprise a sulfuric acid reservoir and a sulfuric acid feed pipe. The lithium phosphate supply pipe and the sulfuric acid supply pipe may be formed in a partially shared form, and lithium phosphate and sulfuric acid can be supplied through one supply pipe.

The pressurizer (200) pressurizes the space inside the reaction body (100). Accordingly, the solid and the liquid in the reactant can be separated by applying pressure to the product formed by the reaction of lithium phosphate and sulfuric acid.

The stirrer 300 is disposed in the upper space 110 of the reaction body 100. Lithium phosphate and sulfuric acid supplied into the reaction body 100 are stirred to prepare a mixture containing lithium sulfate and phosphoric acid. A mixture containing lithium sulfate and phosphoric acid may be produced through the operation of the stirrer 300 and lithium phosphate and sulfuric acid are supplied to the upper space 110.

The filter 400 is disposed inside the reaction body 100 and separates the upper space 110 and the lower space 120 of the reaction body from each other. A mixture containing lithium sulfate and phosphoric acid can be separated by solid-liquid separation through the filter 400. Specifically, the solid lithium sulfate remains on the filter 400, and the phosphoric acid in the liquid phase can be filtered by the filter 400. The mixture falls to the side of the filter 400 and can be filtered by the filter 400.

The filter 400 is formed to be compact without separating the upper space 110 and the lower space 120 by physical means so that the mixture may not leak into the lower space 120 through the filter 400 without the operation of the pressurizer 200.

In the process of filtration of the mixture by the filter 400, pressure may be applied to the inner space of the reaction body 100 by the operation of the pressurizer 200. Thus, effective filtration can be possible.

The device for producing lithium sulfate according to an embodiment of the present invention can efficiently perform reaction, stirring and filtration of lithium phosphate and sulfuric acid in one vessel to obtain lithium sulfate and phosphoric acid efficiently.

The device for producing lithium sulfate according to an embodiment of the present invention may further include a recovery unit 500 connected to the lower space 120 and collecting the filtrate. Through the recovery unit 500, the recovered filtrate may contain high concentration of phosphoric acid.

Specifically, the recovery unit 500 may include a recovery pipe 510 for moving the filtrate from the lower space 120, and a filtrate reservoir for storing the filtrate.

The device for producing lithium sulfate according to an embodiment of the present invention includes a cleaning liquid supply unit 600 connected to the upper space 110 and supplying a cleaning liquid into the reaction body 100; and a circulation unit 700 for circulating the cleaning liquid passed through the filter from the lower space 120 to the upper space 110.

The cleaning liquid supply unit 600 may supply the cleaning liquid into the reaction body 100. Residual phosphoric acid remaining on the solid lithium sulfate surface can be washed by the cleaning liquid. The cleaning liquid may be a lithium sulfate aqueous solution. It may be Li aqueous solution having a Li concentration of 30 g/L. Specifically, the cleaning liquid supply unit 600 includes a first reservoir 610 in which the cleaning liquid is stored; a first supply pipe 620 communicating the first reservoir 610 and the upper space 110; and a spray nozzle formed at the end of the first supply pipe 620.

The first reservoir 610 may store the cleaning liquid. The first supply pipe 620 is connected to the upper part of the reaction body 100 to allow the first reservoir 610 and the upper space 110 to communicate with each other. The spray nozzle is formed at the end of the first supply pipe 620 and can effectively wash the lithium sulfate by spraying the cleaning liquid.

The circulation unit 700 can move the cleaning liquid, which has passed through the filter 400, from the lower space 120 to the upper space 110. Since the cleaning liquid that has passed through the filter 400 has washed the remaining phosphoric acid remaining on the surface of the lithium sulfate, a low concentration of phosphoric acid may be contained. Thus, the cleaning liquid containing phosphoric acid at a low concentration can be supplied to the reaction vessel together with lithium phosphate and sulfuric acid, and stirred together. Thus, stirring of lithium phosphate and sulfuric acid can be smoothly performed.

The circulation unit 700 may include a circulation pipe 810 for connecting the lower space 120 and the upper space 110 and a circulation pump installed on the circulation pipe 710. The circulation pipe 710 allows the lower space 120 and the upper space 110 to communicate with each other. Through the circulation pipe 710, the cleaning liquid containing a low concentration of phosphoric acid can be moved. The circulation pump may be installed in the circulation pipe 710 to provide a driving force so that the cleaning liquid containing low-concentration phosphoric acid can be moved from the lower space 120 to the upper space 110.

The circulation unit 700 may further include a density measuring device installed inside the circulation pipe 710 and measuring the density of the cleaning liquid that has passed through the filter 400. Thus, by measuring the density of the cleaning liquid passing through the filter 400, the phosphorus content in the cleaning liquid passing through the filter 400 can be known. As a result, the phosphorus concentration in the lithium sulfate dissolved in the dissolution liquid can be predicted.

That is, by measuring the density of the cleaning liquid that has passed through the filter 400, it is possible to manufacture lithium sulfate at a high concentration by controlling the concentration of phosphorus in the lithium sulfate dissolved in the dissolution liquid.

The device for producing lithium sulfate according to an embodiment of the present invention includes a dissolution liquid supply unit 800 connected to the upper space 110 and supplying a dissolution liquid into the reaction body 100; and a obtaining unit 900 for obtaining lithium sulfate dissolved in the dissolution liquid through a resultant pipe connected to the lower space.

The dissolution liquid supply unit 800 can supply the dissolution liquid into the reaction body 100. The solid lithium sulfate can be dissolved through the dissolution liquid. The dissolution liquid may be composed mainly of water. Specifically, the dissolution liquid supply unit 800 may include a second reservoir 810 for storing the dissolution liquid, a second supply pipe 820 for communicating the upper space 110 with the second reservoir 810.

In the second reservoir 810, the dissolution liquid can be stored. The second supply pipe 820 is connected to the upper portion of the reaction body 100 to allow the second reservoir 810 and the upper space 110 to communicate with each other. Specifically, the first supply pipe 620 and the second supply pipe 820 may share a part. Accordingly, the cleaning liquid and the dissolution liquid can be supplied to the upper space 110 through one pipe.

The obtaining unit 900 includes a resultant pipe 910 connecting the cleaning liquid supply unit 600 and the lower space 120 to obtain lithium sulfate dissolved in the dissolution liquid. Lithium sulfate can be obtained in a liquid state in a dissolved state. Through filtration, it may be possible to obtain lithium sulfate at a high concentration by firstly separating the phosphoric acid and separating the phosphoric acid secondarily through washing.

The first control valve and the second control valve are respectively provided in the resultant pipe 910 and the recovery pipe 510 to open only the first control valve at the time of obtaining the lithium sulfate dissolved in the solution. Conversely, upon recovery of the filtrate contained high concentrate phosphoric acid, only the second control valve can be opened.

More specifically, the cleaning liquid supply unit 600 may further include a connection pipe 630 for connecting the resultant pipe and the first supply pipe 620, and a connection pump installed on the connection pipe 630.

The connection pipe 630 connects the resultant pipe through which the lithium sulfate dissolved in the solution is moved to the first supply pipe 620 through which the cleaning liquid is supplied. Accordingly, it is possible to use a part of lithium sulfate dissolved in the dissolution liquid as a cleaning liquid.

Preparation Method of Lithium
Sulfate—Implementation Example 1

According to an embodiment of the present invention, there is provided a method for producing lithium sulfate using a reaction vessel divided into an upper space and a lower space, comprising the steps of:

injecting solid phase lithium phosphate and sulfuric acid into the reaction vessel;

stirring the solid lithium phosphate and sulfuric acid in the upper space to produce a mixture comprising lithium sulfate and phosphoric acid; and pressurizing the interior of the reaction vessel and filtering the mixture to separate the filtrate containing phosphoric acid into the lower space.

In the step of injecting solid phase lithium phosphate and sulfuric acid into the reaction vessel, lithium phosphate and sulfuric acid are fed into the reaction vessel to perform the reaction. Lithium phosphate and sulfuric acid may be added to the upper part of the reaction vessel.

Next, in the step of stirring lithium phosphate and sulfuric acid to prepare a mixture containing lithium sulfate and phosphoric acid, lithium phosphate and sulfuric acid may be stirred using an agitator provided in the space above the reaction vessel. Due to the reaction, a mixture comprising lithium sulfate and phosphoric acid is produced.

The mixture is prepared through the direct reaction of lithium phosphate and sulfuric acid in solid phase, and the mixture contains a phosphoric acid solution in which sulfate ions are present, and lithium sulfate in solid phase can be precipitated in the phosphoric acid solution.

Next, in the step of pressurizing the inside of the reaction vessel and filtering the mixture and separating the filtrate containing phosphoric acid into the lower space, pressure is applied to the reaction vessel and the mixture is filtered to separate solid lithium sulfate and phosphoric acid solution.

Specifically, the mixture can be filtered using a filter. At this time, a pressurizer capable of pressurizing the interior of the reaction vessel may be used.

Specifically, the total concentration of phosphorus (P) and sulfur (S) in the filtrate may be 5 mol/L or more. More specifically, the total concentration ([P+S] mol/L) of phosphorus (P) and sulfur (S) may be 6 mol/L or more and 15 mol/L or less. The upper limit of this range is the theoretically calculated maximum upper limit. That is, the higher the total concentration of phosphorus and sulfur in the economical range, the greater the lithium recovery rate.

When the total concentration of phosphorus (P) and sulfur (S) satisfies the above range, the solubility of lithium sulfate may decrease and precipitate in a solid phase. That is, the concentration of residual lithium in the solution can be greatly reduced.

Specifically, after the step of pressurizing the inside of the reaction vessel and filtering the mixture and separating the filtrate containing phosphoric acid into the lower space, it may further include recovering the filtrate from the lower space. Thus, it is possible to recover the filtrate containing a high concentration of phosphoric acid.

The method for preparing lithium sulfate according to an embodiment of the present invention may further include a step of spraying the cleaning liquid into the lithium sulfate in a state where the inside of the reaction vessel is pressurized after the step of filtering the mixture.

The lithium sulfate can be washed by spraying the cleaning liquid on the remaining lithium sulfate. Thus, it is possible to clean the phosphoric acid remaining on the surface of the lithium sulfate. By spraying the cleaning liquid with lithium sulfate in a pressurized state, lithium sulfate can be quickly cleaned. Therefore, it is possible to perform cleaning and filtration at the same time.

Specifically, when the recovery rate of the filtrate is not more than a specific recovery rate, the cleaning liquid can be sprayed. Before the cleaning liquid is sprayed, the filtrate can be recovered. After the cleaning liquid is sprayed, the cleaning liquid containing phosphoric acid can be circulated.

In the step of spraying the cleaning liquid onto the lithium sulfate, the amount of the cleaning liquid may be adjusted according to the density of the filtrate by washing the lithium sulfate and measuring the density of the filtered solution.

Further, in the step of spraying the cleaning liquid onto the lithium sulfate, the density of the filtrate can be adjusted to 1.2 to 1.8 g/cc.

By measuring the density of the filtrate, the concentration of phosphorus (P) contained in the filtrate can be derived, and the concentration of P remaining in the lithium sulfate can be derived from the concentration of P in the filtrate, thereby enabling to measure the purity of lithium sulfate will be.

Therefore, the injection amount of the cleaning liquid can be controlled according to the density of the measured filtrate, and the purity of the lithium sulfate can be managed in real time by monitoring the density of the measured filtrate by adjusting the density to 1.2 to 1.8 g/cc.

More specifically, after the step of spraying the cleaning liquid, the method can further include:
injecting the filtrate which is filtered after cleaning lithium sulfate, with the solid lithium phosphate and sulfuric acid into the reaction vessel; and
stirring the filtrate, the solid lithium phosphate and sulfuric acid in the upper space.

After the cleaning liquid is sprayed to the lithium sulfate, the cleaning liquid containing phosphoric acid may be introduced into the reaction vessel together with lithium phosphate and sulfuric acid. After the addition, the cleaning liquid, lithium phosphate and sulfuric acid are stirred to prepare a mixture containing lithium sulfate and phosphoric acid.

That is, from the first cycle of lithium sulfate production, lithium sulfate can be produced more effectively by circulating a cleaning liquid containing such low-concentration phosphoric acid and reacting it with lithium phosphate and sulfuric acid.

After the step of spraying the cleaning liquid, the method can further include: supplying a dissolution liquid to the cleaned lithium sulfate; and obtaining lithium sulfate dissolved in the dissolution liquid.

It is possible to obtain a liquid lithium sulfate by supplying a dissolution liquid to the washed lithium sulfate. Further, after the step of obtaining lithium sulfate dissolved in the dissolution liquid, the method can further include:
separating the lithium sulfate dissolved in the dissolution liquid and spraying the lithium sulfate together with the cleaning liquid into the lithium sulfate (solid phase). Thus, lithium sulfate can be washed by spraying a part of lithium sulfate dissolved in the solution with lithium sulfate to the cleaning liquid.

Li has high solubility in water or low concentration phosphoric acid, but its solubility can be drastically lowered in a high concentration phosphoric acid solution in which sulfate ion exists. In a high concentration phosphoric acid solution in which sulfuric acid ions are present, Li above the solubility is precipitated in the form of lithium sulfate ($Li_2SO_4$). A high concentration phosphoric acid solution is produced through direct reaction between lithium phosphate and sulfuric acid. Lithium sulfate precipitated can be separated by solid-liquid separation. Also, it is possible to directly extract high concentration phosphoric acid from lithium phosphate.

The process for preparing lithium sulfate according to an embodiment of the present invention simplifies the process by implementing a three-step process of solid-liquid separation, LS purification, and LS dissolution for the production of lithium sulfate in a single reactor. Purified lithium sulfate can be produced with high efficiency of 95% or more.

Preparation Method of Lithium
Sulfate—Implementation Example 2

According to an embodiment of the present invention, there is provided a method of manufacturing lithium sulfate comprising:
introducing solid phase lithium phosphate and sulfuric acid into a reaction vessel;
producing a mixture comprising solid lithium sulfate and phosphoric acid by stirring the solid lithium phosphate and sulfuric acid;
recovering a filtrate comprising the phosphoric acid by pressurizing and filtering the mixture; and
cleaning and filtering the mixture by spraying the cleaning liquid with the mixture being pressurized.

In the step of spraying the cleaning liquid, cleaning and filtering of the mixture may be performed at the same time.

First, in the step of introducing solid phase lithium phosphate and sulfuric acid, solid phosphoric acid and sulfuric acid are fed into a reaction vessel provided with a space therein.

Next, in the step of preparing the mixture, a solid phase mixture of lithium sulfate and phosphoric acid is prepared by stirring the solid phase phosphorus and sulfuric acid introduced into the reaction vessel so that the reaction can take place. The mixture may be a mixture of solid particles having an average particle size of 0.01 to 200 μm and liquid. The particle fraction of the solid phase can be 0.001 to 50% by weight. The properties of the mixture may be in a slurry state.

Specifically, the mixture is prepared through the direct reaction of solid phase lithium phosphate and sulfuric acid. The mixture contains a phosphoric acid solution in which sulfate ions are present, and lithium sulfate in the solid phase can be precipitated in the phosphoric acid solution.

Next, in the step of filtering the mixture, pressure is applied to the mixture, and the mixture is filtered to separate the filtrate containing the phosphoric acid in the liquid phase from the mixture. The separated filtrate is recovered. As a result, the filtrate containing solid lithium sulfate and phosphoric acid can be separated by solid-liquid separation. Specifically, the mixture can be pressurized to 2 to 4 bar.

Next, the mixture is pressurized, and the cleaning liquid is sprayed onto the mixture to be filtered. Accordingly, washing and filtration of the mixture can be performed at the same time. Specifically, the mixture can be maintained at a pressure of 2 to 4 bar. Specifically, in the step of spraying the cleaning liquid, the total weight of the cleaning liquid to be sprayed is 0.9 to 1.2 times the weight of the solid phase particles contained in the mixture before spraying the cleaning liquid.

Specifically, the mixture may be washed by spraying a cleaning liquid before the properties of the mixture change from a slurry to a cake state. When the proportion of the solid phase particles in the mixture becomes 30 to 50% by weight, the cleaning liquid may be added to maintain the solid phase particle ratio of 30 to 60% in the mixture.

As shown in FIG. 1, the filtration rate of the filtrate gradually decreases from the slurry characteristic to the cake characteristic phase, the density of the mixture of the cake characteristic increases, and the liquid content decreases. The lower the liquid content, the lower the rate at which the cleaning liquid passes through the mixture, so that the cleaning efficiency increases but the filtration time becomes excessively long.

Further, as the thickness of the mixture of cakes increases, the minimum pressure for filtration is required to be increased. This may exceed the maximum pressure range that the filter of the reaction vessel can apply, so that further filtration may become impossible.

Therefore, instead of lowering the liquid content of the mixture, the cleaning liquid is introduced at the same rate as the filtrate is filtered from the mixture at the time when the property of the mixture changes from the slurry to the cake, so that filtration and washing of the mixture can be performed at the same time.

Specifically, in the step of filtering the mixture, when the area of the filter is about 0.2 to 0.4 m$^2$ and the recovery rate of the filtrate is 0.7 to 0.9 L/min, the spraying of the cleaning liquid can be started. Also, when the liquid content is 45 to 53% by weight, the spraying of the cleaning liquid can be started.

Specifically, the total concentration of phosphorus (P) and sulfur (S) in the filtrate may be 5 mol/L or more. More specifically, the total concentration ([P+S] mol/L) of phosphorus (P) and sulfur (S) may be 6 mol/L or more and 15 mol/L or less. The upper limit of this range is the theoretically calculated maximum upper limit. That is, the higher the total concentration of phosphorus and sulfur in the economical range, the greater the lithium recovery rate.

When the total concentration of phosphorus (P) and sulfur (S) satisfies the above range, the solubility of lithium sulfate may decrease and precipitate in a solid phase. That is, the concentration of residual lithium in the solution can be greatly reduced.

In addition, in the step of spraying the cleaning liquid, the cleaning liquid is sprayed and then the filtrate can be recovered from the mixture. The cleaning liquid is sprayed at 0.7 to 0.9 L/min for maintaining recovery rate of the filtrate when the area of the filter is about 0.2 to 0.4 m$^2$. And the cleaning liquid may be sprayed so that the mixture maintains the slurry state such that the liquid content of the mixture is maintained at 45 to 53%.

Accordingly, the process time required for filtration and washing can be shortened, and the solid particles and liquid can be separated by 95% or more without being influenced by the mixture thickness of the cake.

Specifically, after the step of spraying the cleaning liquid, the density of the filtrate to be filtered from the mixture may be measured, and if the density of the filtrate is 1.51 g/cc or less, it may be determined that washing of the mixture has proceeded.

Further, after the step of measuring the density of the filtrate, the step of finishing the spraying of the cleaning liquid when the density of the filtrate is 1.25 g/cc or less may be further included.

Even after the cleaning liquid is sprayed, the density of the filtrate can be maintained at the same level as the density before the cleaning liquid is injected for a certain period of time. This is because the concentration of phosphorus (P) present in the mixture is high. When the amount of the filtrate to be recovered becomes equal to the weight of the liquid contained in the mixture before the cleaning liquid is injected, the density of the filtrate can be drastically reduced. It may mean that the concentration of phosphorus (P) remaining in the mixture has been reduced.

The method can further include:
  supplying a dissolution liquid to the remained solid lithium sulfate filtered the filtrate from the mixture; and
  obtaining lithium sulfate dissolved in the dissolution liquid, after the step of spraying the cleaning liquid.

In the step of supplying the dissolution liquid, it can be dissolved by supplying the dissolution liquid to the washed lithium sulfate. The dissolution liquid may be composed mainly of water.

Next, it is possible to obtain lithium sulfate dissolved in the solution.

Hereinafter, specific examples of the present invention will be described. However, the following examples are only a concrete example of the present invention, and the present invention is not limited to the following examples.

Example A

1. Prediction of Phosphoric Acid Concentration in Lithium Sulfate by Measuring the Density of Washing Solution Washed with Lithium Sulfate Slurry, which is a mixture of solid lithium sulfate and a liquid with phosphoric acid as a main component, was prepared and put into a lithium sulfate production apparatus according to one embodiment of the present invention, followed by solid-liquid separation through filtration. The liquid in the slurry was analyzed to about 78 kg and the solid to about 35 kg, and the pressure of the gas supplied for filtration was set to 3 bar.

After the start of the solid-liquid separation, when the recovery rate of the filtrate gradually decreased to about 0.8 L/min, the washing solution injection (aqueous lithium sulfate solution having a Li concentration of 30 g/L) was started from the upper part of the slurry. After the start of the washing solution injection, the recovered amount of the filtrate, which was washed with lithium sulfate, was about 40 kg, and the ratio of the solid in the slurry was calculated to be about 48 wt %.

For convenience, the filtrate 1 refers to the solution filtered through the filter before spraying the washing solution, and the filtrate 2 refers to the solution passed through the filter with the mixture due to the spraying of the washing solution. Thus, the filtrate 1 may contain relatively high concentrations of phosphoric acid, and the filtrate 2 may comprise relatively low concentrations of phosphoric acid.

Figure 2:
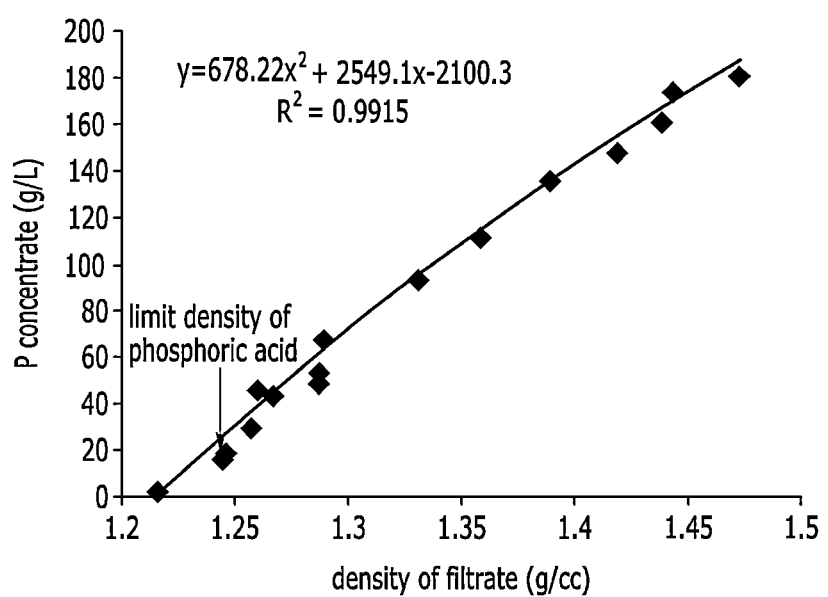
FIG. 2 is a graph showing changes in P concentration according to density of a filtrate according to an embodiment of the present invention.

During the solid—liquid separation, the filtrate 2 discharged through the filter was recovered to analyze the density of the filtrate 2 and the P concentration in the filtrate 2. The density of the filtrate 2 was 1.22 g/cc at 1.48 g/cc and the concentration of P in the filtrate 2 was 2 g/L at 190 g L. The change in P concentration according to the density of the filtrate is shown in FIG. 2.

When the slurry as a mixed solution is subjected to solid-liquid separation and washed to recover high-purity lithium sulfate, and the lithium sulfate is dissolved to finally recover the lithium sulfate aqueous solution, the content of residual P in the aqueous lithium sulfate solution can be predicted as follows.

Figure 3:
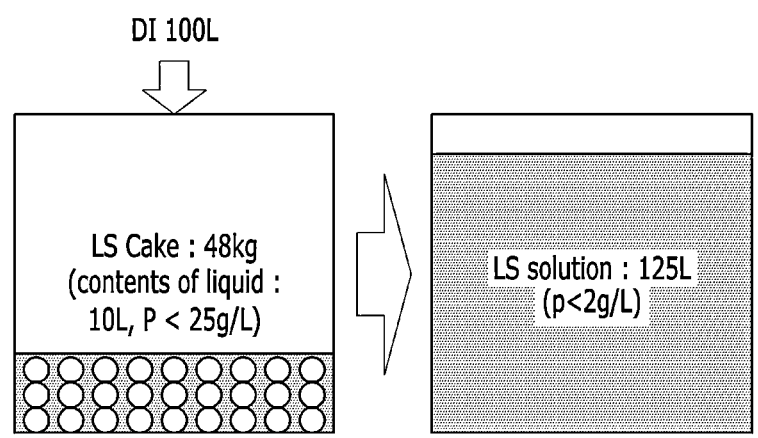
FIG. 3 is a graph showing the amount of lithium sulfate in solid phase; and the total amount and the liquid amount of lithium sulfate cake; according to the liquid content of lithium sulfate cake which is lithium sulfate dissolved in the dissolution liquid, according to an embodiment of the present invention.

Referring to FIG. 3, when the amount of lithium sulfate in the solid phase is 35 kg and the water content of lithium sulfate cake which is lithium sulfate dissolved in the solution is 27 wt %, the total amount of lithium sulfate cake is about 48 kg, and liquid phase is about 10 L. Assuming that the recovered lithium sulfate cake is dissolved to produce a 125 L lithium sulfate solution, when the limit of the residual P content in the lithium sulfate solution is set to 2 g/L or less, the concentration of the liquid P remaining in the lithium sulfate cake should be 25 g/L or less.

After the completion of the washing solution injection, the filtrate 2 obtained is considered to have a liquid phase property remaining in the lithium sulfate cake. Therefore, when the density of the obtained filtrate 2 is 1.25 g/L or less after the completion of the washing solution injection according to the correlation between the filtrate 2 density and the P concentration shown in FIG. 2, the concentration of P in the liquid phase remaining in the lithium sulfate cake becomes 25 g/L or less. Finally, the residual P content of the recovered lithium sulfate solution can be controlled to 2 g/L or less.

This value may vary depending on the level of control of the P content remaining in the lithium sulfate solution, but it can be managed through the measurement of the density of the obtained filtrate 2 after the completion of the washing liquid injection.

Figure 4:
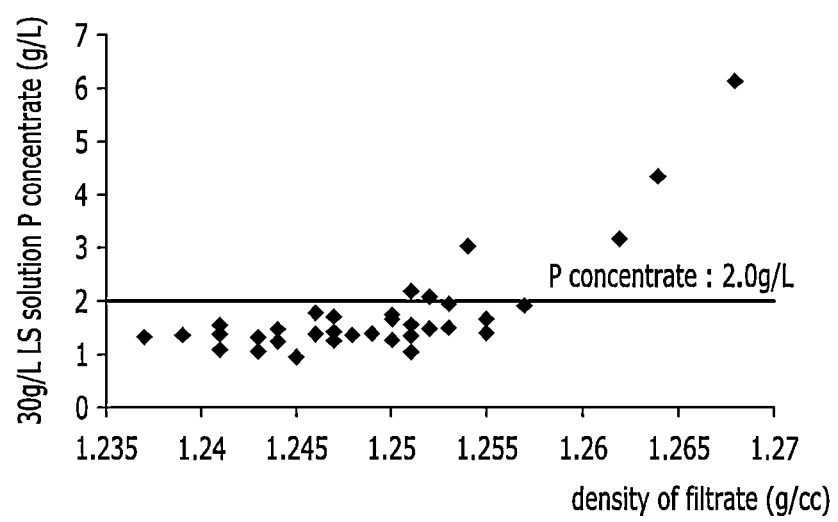
FIG. 4 is a graph showing the P concentration of the lithium sulfate solution depending on the density of the filtrate obtained after completion of the cleaning liquid injection according to the embodiment of the present invention.

FIG. 4 shows the P concentration of the lithium sulfate solution depending on the density of the filtrate 2 obtained after the completion of the washing liquid injection. As predicted, when the P concentration of the lithium sulfate solution is controlled to be 2 g/L or less, it can be understood that the density of the obtained filtrate 2 should be 1.25 g/L or less after the completion of the washing solution injection. In the case of the S concentration, since the S concentration is also determined according to the chemical equivalent when the Li concentration is determined, the S concentration of the solution having the Li concentration of 30 g/L can be about 80 g/L.

After the completion of the washing solution injection, the density of the obtained filtrate 2 can be measured in real time through a conventional apparatus, whereby the purity of the produced lithium sulfate can be measured in real time. It may mean that the process for producing lithium sulfate using the apparatus for producing lithium sulfate according to an embodiment of the present invention is continuous and automatable.

2. Retention of Filtration Rate and Separation of Solid and Liquid by Simultaneous Filtration and Washing A slurry which is a mixture of lithium sulfate in solid phase and a liquid in which the main component is phosphoric acid was prepared and put into a lithium sulfate production apparatus according to one embodiment of the present invention, followed by solid-liquid separation through filtration. In the slurry, the liquid was analyzed to about 78 kg and the solid to about 35 kg, and the pressure of the gas supplied for filtration was set to 3 bar.

After the start of the solid-liquid separation, when the recovery rate of the filtrate 1 gradually decreased to about 0.8 L/min, the spraying of the washing solution (lithium sulfate aqueous solution having a Li concentration of 30 g/L) was started at the upper part of the slurry. At the beginning of the washing solution, the recovery of the filtrate 1 was about 40 kg, and the ratio of the solid in the slurry was calculated to be about 48 wt % (at the "start of spraying", the washing solution had not yet passed through the filter, so that the solution is judged to be a filtrate 1). After the washing solution injection, the filtrate 2 recovery rate was maintained at about 0.8 L/min.

Figure 5:
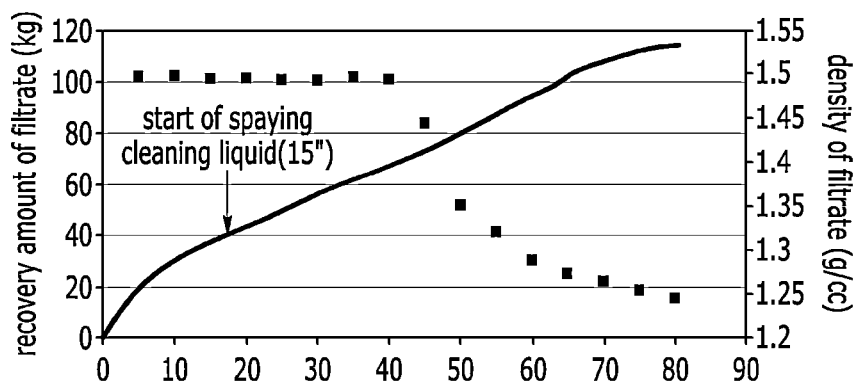
FIG. 5 is a graph showing the results of measurement of the density of the recovered filtrate during filtration and cleaning according to an embodiment of the present invention. The blue line represents the filtrate yield over time and the red dot represents the filtrate density.

The results of the filtration and washing are shown in FIG. 5. After the start of filtration, the density of the recovered filtrate 1 was found to be about 1.51 g/cc, and the specific gravity of the phosphoric acid contained was very high. After spraying the washing solution, the density of the filtrate 2 was uniformly maintained at about 1.51 g/cc, and the specific gravity was drastically decreased when the recovered amount was close to the liquid weight of about 78 kg in the slurry.

This is because the content of phosphoric acid in the recovered filtrate 2 is sharply reduced, which means that the phosphoric acid remaining in the slurry is rapidly reduced. After completion of the washing, the thickness of the recovered lithium sulfate cake was measured to be about 190 mm.

Figure 6:
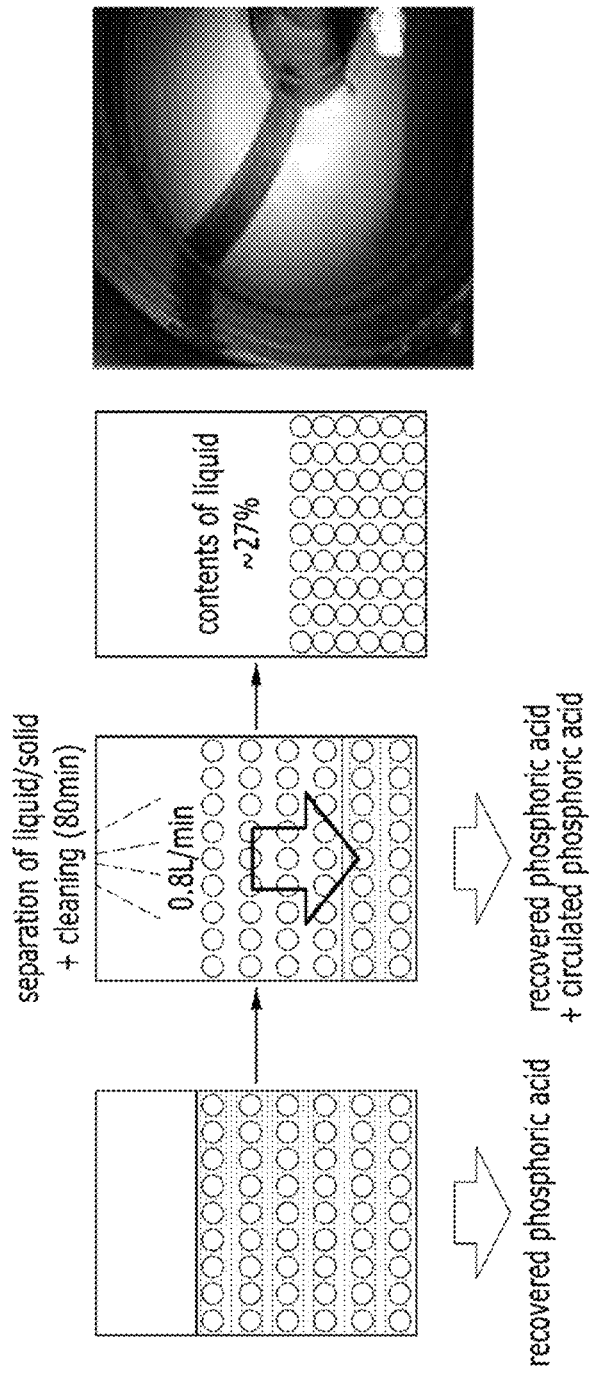
FIG. 6 is a schematic view of a filtration/cleaning simultaneous process according to an embodiment of the present invention.

As shown in FIG. 5, the filtrate 1 recovered at the initial stage of filtration/washing can be recovered as a high concentration of phosphoric acid. Since the recovered filtrate 2 has a low phosphoric acid concentration after the washing liquid is sprayed, it is possible to constitute a process to be used in the next step. A schematic diagram of the simultaneous filtration/washing process is shown in FIG. 6.

3. Preparation of Lithium Sulfate Aqueous Solution

Figure 7:
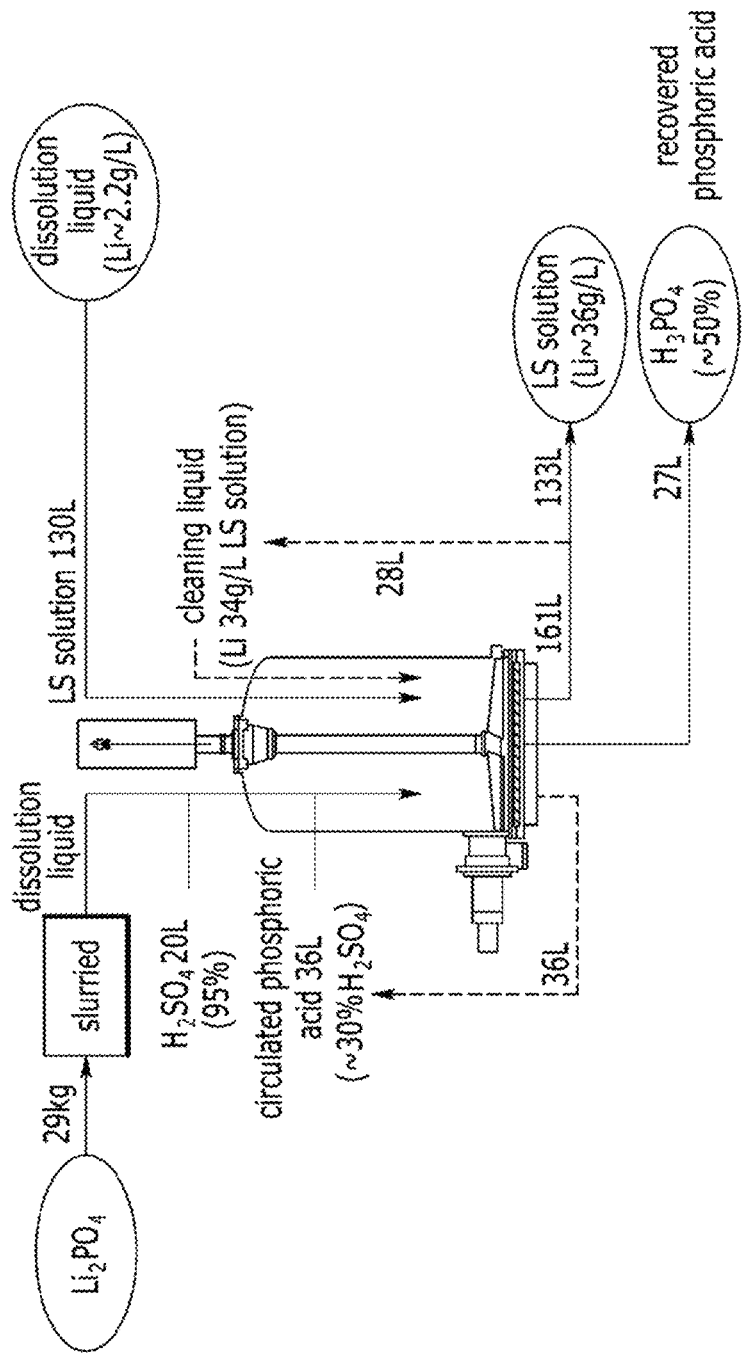
FIG. 7 is a view illustrating a device for producing lithium sulfate according to an embodiment of the present invention.

An aqueous solution of lithium sulfate using lithium phosphate was prepared by using the apparatus for producing lithium sulfate according to an embodiment of the present invention. The material balance is shown in FIG. 7. The composition of lithium phosphate is shown in Table 1 below.

TABLE 1

| | | | | | Composition (wt. %) Lithium phosphate | | | | | | |
|---|---|---|---|---|---|---|---|---|---|---|---|
| Li | K | Ca | Sr | Ti | V | Cr | Mn | Fe | Co | Ni | Cu |
| 16.43 | <0.0005 | 0.002 | <0.0005 | <0.0005 | <0.0005 | <0.0005 | <0.0005 | <0.0005 | <0.0005 | 0.0165 | <0.0005 |
| Zn | Al | B | P | S | Mo | Pb | Cd | Na | Mg | Ba | etc. |
| <0.0005 | <0.0005 | 0.0031 | 23.19 | 1.535 | <0.0005 | <0.0005 | <0.0005 | 1.655 | 0.0009 | <0.0005 | <0.0005 |

29 kg of lithium phosphate was slurried in DIW, injected into a lithium sulfate manufacturing apparatus according to one embodiment of the present invention, pressurized and filtered to prepare lithium phosphate cake. 36 L of circulating phosphoric acid was poured into the lithium phosphate cake, stirred for about 10 minutes to disperse the lithium phosphate cake, and then 20 L of sulfuric acid at a concentration of 95% was added. The circulating phosphoric acid may be a filtrate 2 which is a washing solution in which lithium sulfate is washed.

Thereafter, the mixture was stirred to convert lithium phosphate to lithium sulfate. After conversion to lithium sulfate, the solution was pressurized at 3 bar to recover a fixed amount of recovered phosphoric acid, and at the same time, a lithium sulfate solution having a Li concentration of about 34 g/L was injected for filtration/washing. The recovered phosphoric acid may mean a filtrate 1 filtered with a filter in a mixed solution.

The washing solution was misting so as to be uniformly sprayed on the entire surface of the slurry. After recovering the recovered phosphoric acid, the obtained filtrate 2 was stored and used as the circulating phosphoric acid in the next batch. After the completion of the washing solution injection, the density of the obtained filtrate 2 was measured, and it was confirmed that the P concentration was below the control standard. Then, 130 L of a dissolution liquid having a composition of about 2.2 g/L of Li and about 0.4 g/L of P was added and stirred to prepare a lithium sulfate solution. A portion of the recovered lithium sulfate solution was utilized as a washing solution in the next batch, and the remaining portion was recovered as a lithium sulfate solution.

Recovery of phosphoric acid by process batch is shown in Table 2 below.

TABLE 2

| | | | | | | Component of recovered phosphoric acid (g/L) | | | | | | | |
|---|---|---|---|---|---|---|---|---|---|---|---|---|---|
| No. | Li | S | P | Ca | Mg | Na | B | Fe | Ni | Cr | K | Al | Mn | etc. |
| 1 | 12.66 | 55.94 | 230.37 | 0.035 | 0.152 | 9.05 | 0.047 | 0.174 | 0.214 | 0.052 | 0.008 | 0.004 | 0.003 | <0.003 |
| 2 | 12.83 | 58.21 | 231.21 | 0.033 | 0.133 | 8.86 | 0.047 | 0.196 | 0.222 | 0.059 | 0.009 | 0.004 | 0.004 | <0.003 |
| 3 | 10.95 | 66.99 | 229.99 | 0.030 | 0.109 | 8.61 | 0.040 | 0.247 | 0.224 | 0.071 | 0.007 | 0.003 | 0.005 | <0.003 |
| 4 | 9.90 | 71.21 | 234.69 | 0.030 | 0.082 | 7.90 | 0.038 | 0.282 | 0.224 | 0.080 | 0.007 | 0.003 | 0.005 | <0.003 |
| 5 | 11.26 | 75.59 | 236.94 | 0.029 | 0.075 | 8.31 | 0.035 | 0.321 | 0.230 | 0.090 | 0.009 | <0.003 | 0.006 | <0.003 |
| 6 | 11.35 | 75.35 | 230.32 | 0.027 | 0.065 | 7.79 | 0.034 | 0.371 | 0.235 | 0.102 | 0.009 | <0.003 | 0.007 | <0.003 |
| 7 | 9.71 | 76.83 | 225.25 | 0.025 | 0.054 | 7.59 | 0.033 | 0.417 | 0.243 | 0.114 | 0.006 | <0.003 | 0.008 | <0.003 |
| 8 | 9.8 | 74.34 | 223.09 | 0.025 | 0.054 | 7.59 | 0.033 | 0.417 | 0.243 | 0.114 | 0.007 | <0.003 | 0.008 | <0.003 |
| 9 | 10.0 | 68.14 | 227.59 | 0.025 | 0.039 | 7.69 | 0.032 | 0.378 | 0.238 | 0.104 | 0.008 | <0.003 | 0.007 | <0.003 |
| 10 | 10.89 | 74.28 | 224.52 | 0.024 | 0.032 | 7.65 | 0.031 | 0.390 | 0.233 | 0.106 | 0.008 | <0.003 | 0.007 | <0.003 |
| 11 | 10.99 | 77.39 | 222.99 | 0.023 | 0.030 | 7.62 | 0.031 | 0.417 | 0.240 | 0.114 | 0.008 | <0.003 | 0.008 | <0.003 |
| 12 | 9.29 | 74.37 | 226.44 | 0.022 | 0.027 | 7.65 | 0.030 | 0.418 | 0.243 | 0.115 | 0.006 | <0.003 | 0.008 | <0.003 |

As can be seen from the above Table 2, the recovered phosphoric acid was a high concentration phosphoric acid solution having an average P concentration of 228.67 g/L and could be utilized in other manufacturing processes using phosphoric acid.

The characteristics of the recovered circulated phosphoric acid according to the process arrangement are shown in Table 3 below.

TABLE 3

| | | | | | | Circulated phosphoric acid Tank contents (g/L) | | | | | | | |
|---|---|---|---|---|---|---|---|---|---|---|---|---|---|
| No. | Li | S | P | Ca | Mg | Na | B | Fe | Ni | Cr | K | Al | Mn | etc. |
| 1 | 12.66 | 55.94 | 230.37 | 0.035 | 0.152 | 9.05 | 0.047 | 0.174 | 0.214 | 0.052 | 0.008 | 0.004 | 0.003 | <0.003 |
| 2 | 12.83 | 58.21 | 231.21 | 0.033 | 0.133 | 8.86 | 0.047 | 0.196 | 0.222 | 0.059 | 0.009 | 0.004 | 0.004 | <0.003 |
| 3 | 10.95 | 66.99 | 229.99 | 0.030 | 0.109 | 8.61 | 0.040 | 0.247 | 0.224 | 0.071 | 0.007 | 0.003 | 0.005 | <0.003 |
| 4 | 9.90 | 71.21 | 234.69 | 0.030 | 0.082 | 7.90 | 0.038 | 0.282 | 0.224 | 0.080 | 0.007 | 0.003 | 0.005 | <0.003 |
| 5 | 11.26 | 75.59 | 236.94 | 0.029 | 0.075 | 8.31 | 0.035 | 0.321 | 0.230 | 0.090 | 0.009 | <0.003 | 0.006 | <0.003 |
| 6 | 11.35 | 75.35 | 230.32 | 0.027 | 0.065 | 7.79 | 0.034 | 0.371 | 0.235 | 0.102 | 0.009 | <0.003 | 0.007 | <0.003 |
| 7 | 9.71 | 76.83 | 225.25 | 0.025 | 0.054 | 7.59 | 0.033 | 0.417 | 0.243 | 0.114 | 0.006 | <0.003 | 0.008 | <0.003 |
| 8 | 9.8 | 74.34 | 223.09 | 0.025 | 0.054 | 7.59 | 0.033 | 0.417 | 0.243 | 0.114 | 0.007 | <0.003 | 0.008 | <0.003 |

TABLE 3-continued

| | Circulated phosphoric acid Tank contents (g/L) | | | | | | | | | | | | |
|---|---|---|---|---|---|---|---|---|---|---|---|---|---|
| No. | Li | S | P | Ca | Mg | Na | B | Fe | Ni | Cr | K | Al | Mn | etc. |
| 9 | 10.01 | 68.14 | 227.59 | 0.025 | 0.039 | 7.69 | 0.032 | 0.378 | 0.238 | 0.104 | 0.008 | <0.003 | 0.007 | <0.003 |
| 10 | 10.89 | 74.28 | 224.52 | 0.024 | 0.032 | 7.65 | 0.031 | 0.390 | 0.233 | 0.106 | 0.008 | <0.003 | 0.007 | <0.003 |
| 11 | 10.99 | 77.39 | 222.99 | 0.023 | 0.030 | 7.62 | 0.031 | 0.417 | 0.240 | 0.114 | 0.008 | <0.003 | 0.008 | <0.003 |
| 12 | 9.29 | 74.37 | 226.44 | 0.022 | 0.027 | 7.65 | 0.030 | 0.418 | 0.243 | 0.115 | 0.006 | <0.003 | 0.008 | <0.003 |

As shown in Table 3, during the process, the P concentration of the circulating phosphoric acid was maintained at about 228 g/L, which means that the present process is very stable. The properties of the dissolution solution added to dissolve solid lithium sulfate are shown in Table 4 below.

TABLE 4

| Solution of lithium sulfate (g/L) | | | | | | | | | | | | | |
|---|---|---|---|---|---|---|---|---|---|---|---|---|---|
| Li | S | P | Ca | Mg | Na | B | Fe | Ni | Cr | K | Al | Mn | etc. |
| 2.22 | 6.015 | 0.395 | <0.003 | 0.006 | 0.0065 | <0.003 | <0.003 | <0.003 | <0.003 | <0.003 | <0.003 | <0.003 | <0.003 |

The properties of the recovered lithium sulfate solution are shown in Table 5 below.

TABLE 5

| | Contents of solution of lithium sulfate (g/L) | | | | | | | | | | | | |
|---|---|---|---|---|---|---|---|---|---|---|---|---|---|
| No. | Li | S | P | Ca | Mg | Na | B | Fe | Ni | Cr | K | Al | Mn | etc. |
| 1 | 36.00 | 84.58 | 2.4 | <0.003 | 0.006 | 0.153 | <0.003 | 0.005 | <0.003 | <0.003 | <0.003 | <0.003 | <0.003 | <0.003 |
| 2 | 36.20 | 86.61 | 2.54 | <0.003 | 0.006 | 0.159 | <0.003 | 0.005 | 0.003 | <0.003 | <0.003 | <0.003 | <0.003 | <0.003 |
| 3 | 36.57 | 86.58 | 2.43 | <0.003 | 0.005 | 0.151 | <0.003 | 0.005 | 0.003 | <0.003 | <0.003 | <0.003 | <0.003 | <0.003 |
| 4 | 35.61 | 85.06 | 2.45 | <0.003 | 0.004 | 0.143 | <0.003 | 0.006 | <0.003 | <0.003 | <0.003 | <0.003 | <0.003 | <0.003 |
| 5 | 34.86 | 83.54 | 1.97 | <0.003 | 0.004 | 0.122 | <0.003 | 0.006 | <0.003 | <0.003 | <0.003 | <0.003 | <0.003 | <0.003 |
| 6 | 34.82 | 83.04 | 2.18 | <0.003 | 0.004 | 0.145 | <0.003 | 0.008 | <0.003 | <0.003 | <0.003 | <0.003 | <0.003 | <0.003 |
| 7 | 33.77 | 80.03 | 1.99 | <0.003 | 0.008 | 0.14 | <0.003 | 0.008 | <0.003 | <0.003 | <0.003 | <0.003 | <0.003 | <0.003 |
| 8 | 33.96 | 80.42 | 1.9 | <0.003 | 0.008 | 0.133 | <0.003 | 0.008 | <0.003 | <0.003 | <0.003 | <0.003 | <0.003 | <0.003 |
| 9 | 33.92 | 80.76 | 2.04 | <0.003 | 0.008 | 0.136 | <0.003 | 0.007 | <0.003 | <0.003 | <0.003 | <0.003 | <0.003 | <0.003 |
| 10 | 34.01 | 80.3 | 1.85 | <0.003 | 0.008 | 0.121 | <0.003 | 0.006 | <0.003 | <0.003 | <0.003 | <0.003 | <0.003 | <0.003 |
| 11 | 33.87 | 80.51 | 2.54 | <0.003 | 0.008 | 0.16 | <0.003 | 0.009 | 0.003 | 0.003 | <0.003 | <0.003 | <0.003 | <0.003 |
| 12 | 34.2 | 81.32 | 2.06 | <0.003 | 0.008 | 0.136 | <0.003 | 0.007 | <0.003 | <0.003 | 0.004 | <0.003 | <0.003 | <0.003 |

As shown in Table 5, the recovered lithium sulfate solution is a high purity lithium sulfate solution having an Li concentration of 34.8 g/L on average, and P of from 2.54 to 1.85 g/L and 0.122 to 0.160 g/L of Na as main impurities. Considering the impurities of lithium phosphate and the P component introduced from the lithium sulfate solution, it can be understood that the solution is a pure lithium sulfate solution in which 95% or more of impurities are removed.

The recovery rates of lithium sulfate and phosphoric acid based on the above results are shown in Table 6 below.

TABLE 6

| | | Recovery rate: LS recovery amount to LP-sulfuric acid injection amount | |
|---|---|---|---|
| | | Li | P |
| No. | LS recovered quantity (L) | Li recovery (LS)/ Li input (LP) | P input (LP) − P loss (LS)/ P input (LP) |
| 1 | 128.50 | 96.62% | 95.42% |
| 2 | 130.02 | 98.35% | 95.11% |
| 3 | 122.00 | 93.30% | 95.61% |
| 4 | 125.67 | 94.09% | 95.41% |
| 5 | 137.03 | 100.65% | 95.97% |
| 6 | 131.47 | 96.49% | 95.72% |
| 7 | 130.69 | 92.50% | 96.14% |
| 8 | 130.88 | 93.41% | 96.30% |
| 9 | 134.24 | 95.31% | 95.94% |
| 10 | 135.49 | 95.80% | 96.31% |
| 11 | 132.80 | 94.15% | 95.00% |
| 12 | 134.24 | 95.74% | 95.91% |
| Operating average | 131.09 | 95.54% | 95.74% |

As shown in Table 6, when lithium sulfate was produced from lithium phosphate, the average recovery of lithium sulfate solution was 131.09 L, and the recovery ratio of Li was 95.54% and the recovery ratio of P was 95.71%. The recovery rate of lithium sulfate using the apparatus for producing lithium sulfate and the manufacturing method according to an embodiment of the present invention is 95% or more.

4. Manufacturing System of Lithium Sulfate Aqueous Solution

As shown in FIG. 7, a lithium sulfate production system using lithium phosphate was constructed. In the lithium phosphate extraction tank, lithium phosphate is extracted from a Li supply material such as brine, ore and waste lithium solution, and the extracted lithium phosphate can be injected into the production apparatus according to an embodiment of the present invention. When a solid lithium phosphate is used as a raw material, it may be slurried in a lithium phosphate slurry mixer and then injected into a manufacturing apparatus according to an embodiment of the present invention. It is also possible to inject solid lithium phosphate. The lithium phosphate is converted to lithium sulfate, purified, and dissolved and transferred to the lithium sulfate recovery tank. The sulfuric acid, the circulating phosphoric acid, and the washing liquid required for the process are supplied from the accessory tank. The washing liquid tank may be pressurized for spray washing during pressure filtration.

Figure 8:
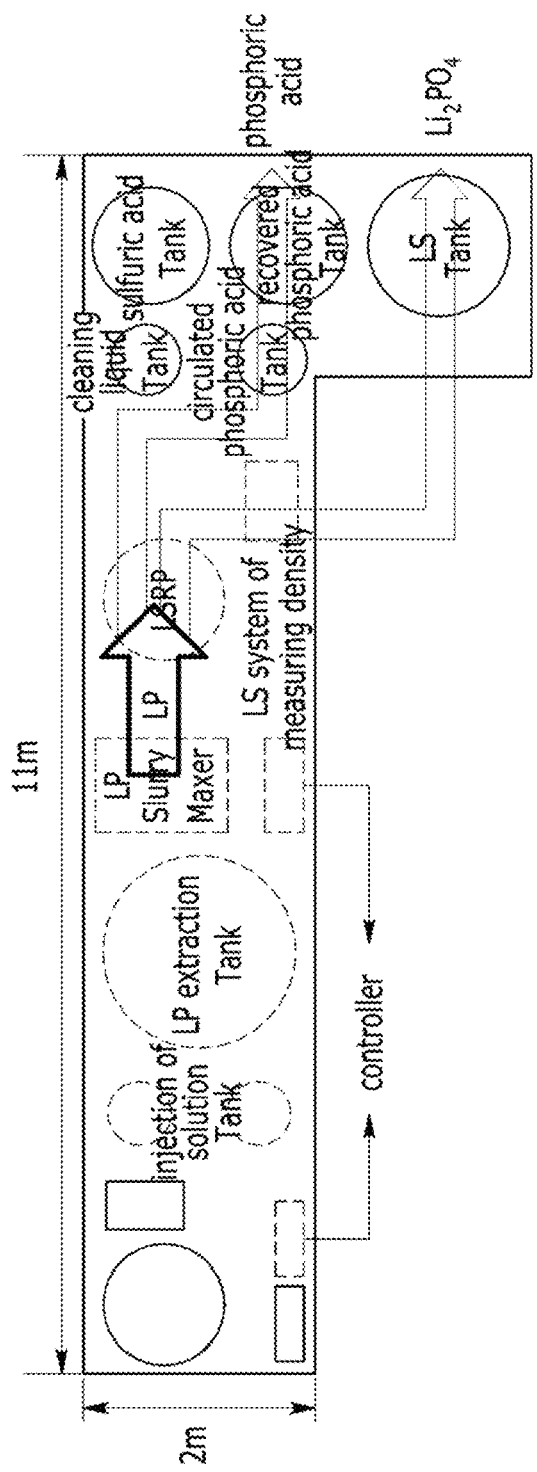
FIG. 8 is a view showing an automated system for manufacturing lithium sulfate using lithium phosphate.
Figure 9:
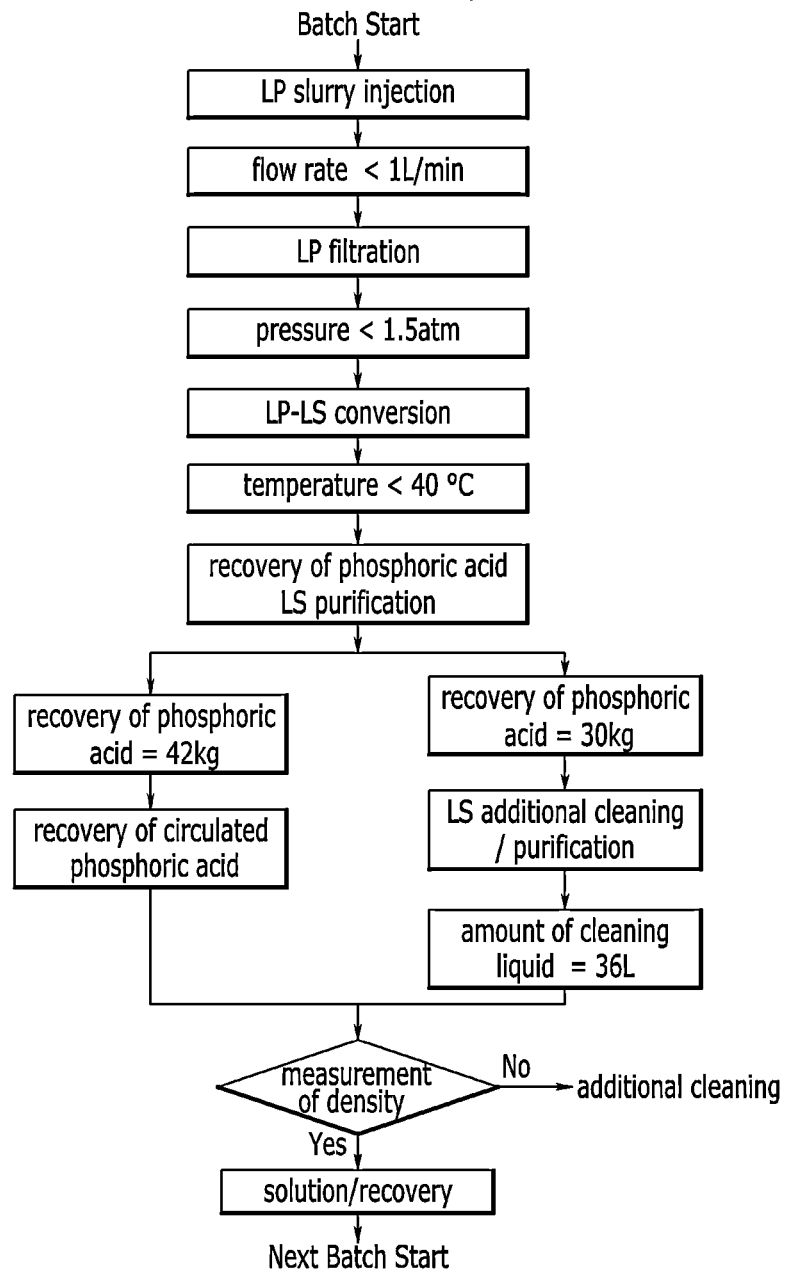
FIG. 9 is a view showing an automated manufacturing process of lithium sulfate using lithium phosphate.

During filtration and washing, the density of the recovered filtrate 2 can be monitored by measuring the real-time density by means of a density measuring system to monitor the purity of the recovered lithium sulfate. The automated manufacturing process of lithium sulfate using lithium phosphate using the above system was configured as shown in FIGS. 8 and 9.

Figure 10:
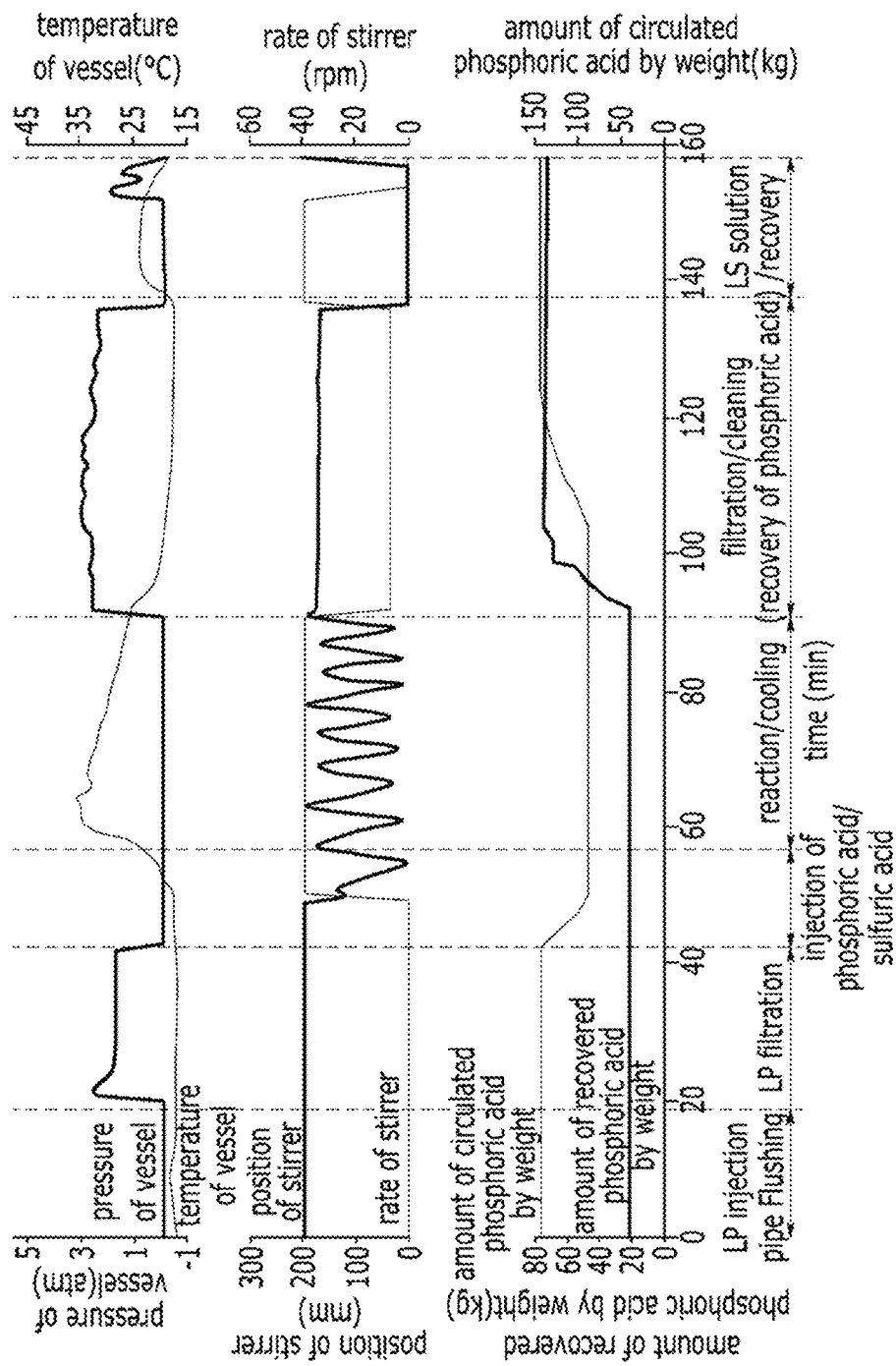
FIG. 10 is a graph showing the main parameters of the device for producing lithium sulfate according to an embodiment of the present invention and the weight change of main tanks.
Figure 11:
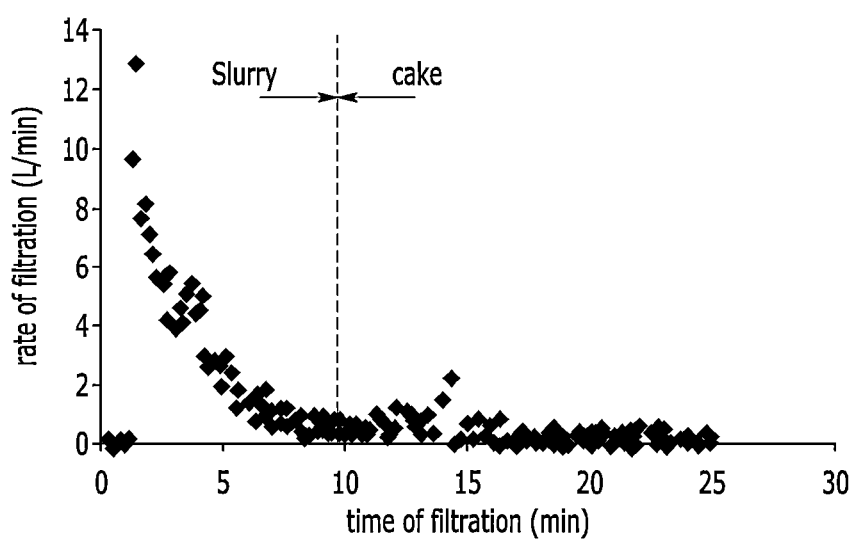
FIG. 11 is a graph showing the correlation of the filtration rate with the filtration time of the mixture.

The weight of lithium phosphate added was assumed to be 29 kg. The filtrate 2 recovery rate was monitored for filtration/washing simultaneously, and the liquid components in the cake were calculated and then reflected in the process. FIG. 10 shows the main parameters of the apparatus for producing lithium sulfate according to an embodiment of the present invention and the weight change of main tanks when the above automated process is operated.

5. Total Concentration of Phosphorus (P) and Sulfur (S) in the Filtrate

The reaction of lithium phosphate with sulfuric acid in an apparatus for producing lithium sulfate according to one embodiment of the present invention and stirring under the conditions shown in the following Table 7 was followed by a test for recovery of a filtrate containing high concentration of phosphoric acid through pressurization and filtration. The results are shown in Table 8.

Lithium phosphate extracted from waste batteries was used as lithium phosphate. The water content of lithium phosphate was measured by 35% after drying for 24 hours at 105 □. The amount of dry lithium phosphate was measured by ICP (Inductively Coupled Plasma), and the amount of sulfuric acid corresponding to one equivalent of reaction formula 1 was calculated. The purity of the used sulfuric acid was 95%.

A phosphoric acid solution having a concentration of 30 to 50 wt % for slurrying lithium phosphate was used, and the phosphoric acid solution was prepared by mixing 85% phosphoric acid solution (daejungchem) and ultrapure water. The slurried lithium phosphate was added to the reaction body together with sulfuric acid, and the mixture was stirred at 200 rpm for about 40 minutes using a stirrer.

Thereafter, the mixture was pressurized to about 50 mbar through a pressurizer and filtered with a filter. The filtrate 1 was sampled and the components were analyzed by ICP analysis. The results are shown in Table 8.

As a result of the test, the recovered liquid phase showed a high concentration of phosphoric acid of 51 to 62 wt % and contained 6.5 to 11 g/L of lithium. The content of lithium was inversely proportional to the sum of phosphorus (P) and sulfur (S) contents in the phosphoric acid component.

TABLE 7

| No. | Phosphoric acid concentration (wt. %) | Amount of phosphoric acid (g) | Lithium phosphate (g) Wet weight | Lithium phosphate (g) Dry weight | 95 wt % $H_2SO_4$ amount (g) |
|---|---|---|---|---|---|
| Sample 1 | 30 | 200 | 483.95 | 315.1 | 421.4 |
| Sample 2 | 30 | 200 | 483.95 | 315.1 | 434.1 |
| Sample 3 | 50 | 200 | 241.98 | 157.6 | 210.7 |

TABLE 8

| No. | The filtrate component (g/L) Li | Na | B | P | S | Ca | Mg | Concentration of phosphoric acid in filtrate (% by weight) | Li molar number | P + S molar number |
|---|---|---|---|---|---|---|---|---|---|---|
| Sample 1 | 10.55 | 7.67 | 0.062 | 241.68 | 78.44 | 0.062 | 0.027 | 51.2 | 1.520 | 10.249 |
| Sample 2 | 11.15 | 8.47 | 0.059 | 243.83 | 72.35 | 0.068 | 0.026 | 51.1 | 1.606 | 10.129 |
| Sample 3 | 6.46 | 7.97 | 0.052 | 316.91 | 57.43 | 0.04 | 0.023 | 62.5 | 0.931 | 12.023 |

Example B

1. Filtration Rate Maintenance and Solid-Liquid Separation by Filtration/Cleaning Under Pressure Example Lithium phosphate and sulfuric acid were put into a reaction vessel according to the method of preparing lithium sulfate according to an embodiment of the present invention, and then stirred to prepare a slurry-like mixture. A slurry-like mixture containing lithium sulfate and phosphoric acid in a solid phase was put into a pressure filtration apparatus, followed by solid-liquid separation.

In the mixture, the liquid was analyzed to about 78 kg and the solid particles to about 35 kg, and the pressure of the gas supplied for filtration was set to 3 bar.

Figure 12:
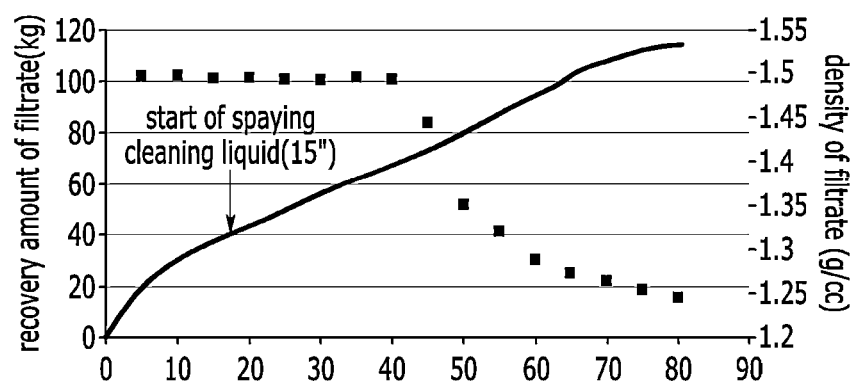
FIG. 12 is a graph showing the results of measurement of the density of the filtrate to be recovered during filtration and cleaning in the lithium sulfate production method according to an embodiment of the present invention. The blue line represents the amount of the recovery of the filtrate over time and the red dot represents the density of the filtrate.
Figure 13:
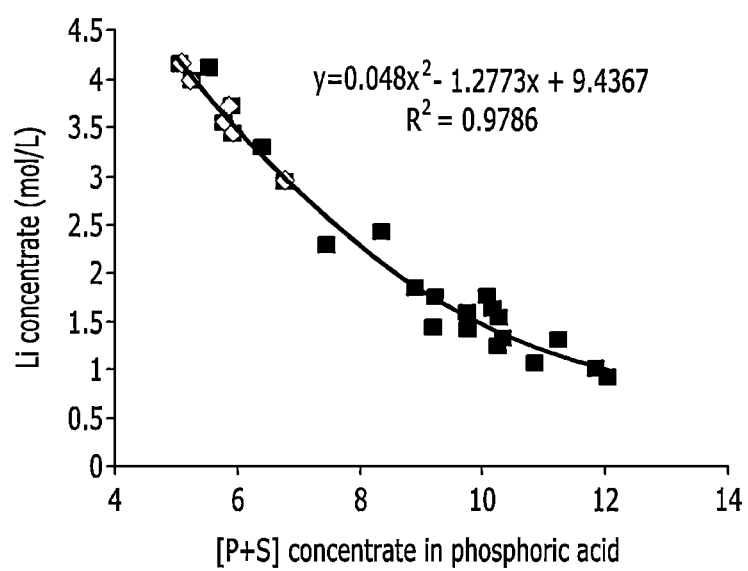
FIG. 13 is a graph showing changes in solubility of lithium depending on the concentrations of phosphorus (P) and sulfur (S) in the filtrate.

After the start of the solid-liquid separation, when the area of the filter was about 0.3 m², and the recovery rate of the filtrate gradually decreased to about 0.8 L/min, the spraying of the washing solution of lithium sulfate aqueous solution having a Li concentration of 30 g/L was started. At the start of the washing solution injection, the recovery amount of the filtrate was about 40 kg, and the proportion of the solid phase particles in the mixture was about 48% by weight. As shown in FIG. 12, after the washing solution injection, the recovery rate of the filtrate was maintained at about 0.8 L/min for about 25 minutes.

The results of measurement of the density of the filtrate to be recovered during filtration and washing are shown in FIG. 12. After the start of filtration, the density of the filtrate to be recovered is about 1.51 g/cc, which indicates that the specific gravity of the phosphoric acid contained in the filtrate is very high. The density of the filtrate remained uniformly at about 1.51 g/cc even after the washing solution injection, and decreased sharply when the total recovered water amounted to about 78 kg, which is the weight of the liquid in the initial mixture.

This is because the content of phosphoric acid in the recovered filtrate is sharply reduced, which means that the phosphoric acid remaining in the mixture is rapidly decreased.

Comparative Example

Lithium phosphate and sulfuric acid were put into a reaction vessel according to the production method of lithium sulfate, and then stirred to prepare a slurry-like mixture. The slurry mixture containing solid lithium sulfate and phosphoric acid was introduced into a vacuum filtration apparatus having an area of filtration filter of 0.07 m², followed by solid-liquid separation. After 120 minutes of solid-liquid separation, the cake was thoroughly filtered, and the cake was washed by spraying a washing solution of lithium sulfate aqueous solution having a Li concentration of 30 g/L at the top of the cake.

The weight of recovered cake was 0.742 to 0.565 kg and the thickness of cake was proportional to the weight of recovered cake from 7 to 50 mm. The collected cake was dissolved by using pure water, and the components of the recovery solution were measured using ICP. The P content of the recovered solution was found to be 1.05 to 11.48 g/L as shown in Table 9 below, and the P component remaining in the cake tended to increase with the thickness of the cake.

TABLE 9

| No. | Cake Weight (kg) | Water content (%) | Li | S | K | Ca | B | Mg | Na | P |
|---|---|---|---|---|---|---|---|---|---|---|
| 1 | 1.7 | 31.04 | 20.93 | 51.23 | 0.003 | 0.004 | 0.013 | <0.003 | 0.109 | 2.86 |
| 2 | 3 | 35 | 28.05 | 70.55 | 0.013 | 0.013 | 0.021 | 0.004 | 0.308 | 6.46 |
| 3 | 3.25 | 29.9 | 28.33 | 71.60 | 0.012 | 0.006 | 0.014 | 0.003 | 0.201 | 4.22 |
| 1 | 0.742 | 28.06 | 28.09 | 70.31 | 0.010 | <0.003 | 0.003 | <0.003 | 0.067 | 1.05 |
| 5 | 5.65 | 31.34 | 29.12 | 73.76 | 0.012 | 0.033 | 0.024 | 0.004 | 0.347 | 6.45 |
| 6 | 4.85 | 35.94 | 25.39 | 64.56 | 0.010 | 0.014 | 0.031 | 0.006 | 0.397 | 9.48 |
| 7 | 1.47 | 35.23 | 27.52 | 68.07 | 0.010 | 0.006 | 0.015 | 0.003 | 0.213 | 4.47 |
| 8 | 4.6 | 31.45 | 26.04 | 65.87 | 0.012 | 0.018 | 0.047 | 0.009 | 0.637 | 11.17 |
| 9 | 3.55 | 31.43 | 31.12 | 77.00 | 0.011 | 0.008 | 0.015 | 0.003 | 0.228 | 3.90 |
| 10 | 3.7 | 27.79 | 28.84 | 72.34 | 0.011 | 0.038 | 0.027 | 0.005 | 0.383 | 7.00 |
| 11 | 3.55 | 28.49 | 26.81 | 68.85 | 0.011 | 0.050 | 0.052 | 0.010 | 0.709 | 11.48 |

Note: "Recovery solution dissolved solid particles (g/L)" spans the Li, S, K, Ca, B, Mg, Na, P columns.

2. Solid-Liquid Separation of the Mixture Through Filtration and Washing Under Pressure Lithium phosphate and sulfuric acid were put into a reaction vessel according to the method of preparing lithium sulfate according to an embodiment of the present invention, and then stirred to prepare a slurry-like mixture. A slurry mixture containing solid lithium sulfate and phosphoric acid was put into a pressure filtration device, and 3 bar of gas was supplied to the filtration device to perform solid-liquid separation.

The proportion of the solid phase particles in the mixture was 29.8 to 31.4% by weight, as shown in Table 10 below. The components of the recovered filtrate are shown in Table 11 below. The filtrate was a high concentration phosphoric acid solution having a concentration of P of 222.9 to 236.9 g/L.

After the initial filtration, when the ratio of solid particles in the mixture of the slurry state reached 48.9 to 52.6% by weight, the spraying of the washing liquid started. The washing solution was misting so as to spray uniformly over the entire mixture of the slurry. At the beginning of the washing, the solid phase particle ratio of the mixture is shown in Table 10 below.

The washing solution used was a lithium sulfate aqueous solution having a Li concentration of 30 g/L, and wash water having a weight of about 1.1 times the solid weight was sprayed.

TABLE 10

| | Before filtration, the mixture | | | Immediately before spraying the cleaning liquid, the mixture | | |
|---|---|---|---|---|---|---|
| No. | liquid (kg) | Solid (kg) | Solid ratio (wt.%) | liquid (kg) | Solid (kg) | Solid ratio (wt.%) |
| 1 | 79.6 | 34.6 | 30.3% | 34.6 | 36.3 | 51.2% |
| 2 | 81.6 | 36.6 | 31.0% | 36.6 | 36.1 | 49.7% |
| 3 | 83.1 | 38.1 | 31.4% | 38.1 | 36.2 | 48.7% |
| 4 | 80.3 | 35.3 | 30.5% | 35.3 | 36.6 | 50.9% |
| 5 | 78.2 | 33.2 | 29.8% | 33.2 | 36.8 | 52.6% |
| 6 | 81.2 | 36.2 | 30.8% | 36.2 | 36.4 | 50.1% |
| 7 | 82.3 | 37.3 | 31.2% | 37.3 | 36.2 | 49.3% |
| 8 | 82.3 | 37.3 | 31.2% | 37.3 | 36.2 | 49.3% |
| 9 | 82.3 | 37.3 | 31.2% | 37.3 | 36.2 | 49.3% |
| 10 | 81.4 | 36.4 | 30.9% | 36.4 | 36.3 | 50.0% |
| 11 | 81.8 | 36.8 | 31.0% | 36.8 | 38.8 | 51.3% |
| 12 | 81.2 | 36.2 | 30.8% | 36.2 | 38.5 | 51.5% |

TABLE 11

| | Filtrate (g/L) | | | | | | | | | | | | | |
|---|---|---|---|---|---|---|---|---|---|---|---|---|---|---|
| No. | Li | S | P | Ca | Mg | Na | B | Fe | Ni | Cr | K | Al | Mn | etc. |
| 1 | 12.66 | 55.94 | 230.37 | 0.035 | 0.152 | 9.05 | 0.047 | 0.174 | 0.214 | 0.052 | 0.008 | 0.004 | 0.003 | 0.003 |
| 2 | 12.83 | 58.21 | 231.21 | 0.033 | 0.133 | 8.86 | 0.047 | 0.196 | 0.222 | 0.059 | 0.009 | 0.004 | 0.004 | <0.003 |
| 3 | 10.95 | 66.99 | 229.99 | 0.030 | 0.109 | 8.61 | 0.040 | 0.247 | 0.224 | 0.071 | 0.007 | 0.003 | 0.005 | <0.003 |
| 4 | 9.90 | 71.21 | 234.69 | 0.030 | 0.082 | 7.90 | 0.038 | 0.282 | 0.224 | 0.080 | 0.007 | 0.003 | 0.005 | <0.003 |
| 5 | 11.26 | 75.59 | 236.94 | 0.029 | 0.075 | 8.31 | 0.035 | 0.321 | 0.230 | 0.090 | 0.009 | <0.003 | 0.006 | <0.003 |
| 6 | 11.35 | 75.35 | 230.32 | 0.027 | 0.065 | 7.79 | 0.034 | 0.371 | 0.235 | 0.102 | 0.009 | <0.003 | 0.007 | <0.003 |
| 7 | 9.71 | 76.83 | 225.25 | 0.025 | 0.054 | 7.59 | 0.033 | 0.417 | 0.243 | 0.114 | 0.006 | <0.003 | 0.008 | <0.003 |
| 8 | 9.8 | 74.34 | 223.09 | 0.025 | 0.054 | 7.59 | 0.033 | 0.417 | 0.243 | 0.114 | 0.007 | <0.003 | 0.008 | <0.003 |
| 9 | 10.01 | 68.14 | 227.59 | 0.025 | 0.039 | 7.69 | 0.032 | 0.378 | 0.238 | 0.104 | 0.008 | <0.003 | 0.007 | <0.003 |
| 10 | 10.89 | 74.28 | 224.52 | 0.024 | 0.032 | 7.65 | 0.031 | 0.390 | 0.233 | 0.106 | 0.008 | <0.003 | 0.007 | <0.003 |
| 11 | 10.99 | 77.39 | 222.99 | 0.023 | 0.030 | 7.62 | 0.031 | 0.417 | 0.240 | 0.114 | 0.008 | <0.003 | 0.008 | <0.003 |
| 12 | 9.29 | 74.37 | 226.44 | 0.022 | 0.027 | 7.65 | 0.030 | 0.418 | 0.243 | 0.115 | 0.006 | <0.003 | 0.008 | <0.003 |

The thickness of the recovered solid after the completion of the washing water spraying was about 190 mm, and was dissolved using the solution of the components shown in Table 12 below. The components of the injected dissolution liquid and the components of the recovered liquid after dissolving the solid particles are shown in Tables 13 and 14 below.

TABLE 12

| Dissolution liquid (g/L) | | | | | | | | | | | | | |
|---|---|---|---|---|---|---|---|---|---|---|---|---|---|
| Li | S | P | Ca | Mg | Na | B | Fe | Ni | Cr | K | Al | Mn | etc. |
| 2.22 | 6.015 | 0.395 | <0.003 | 0.006 | 0.0065 | <0.003 | <0.003 | <0.003 | <0.003 | <0.003 | <0.003 | <0.003 | <0.003 |

TABLE 13

| | Recovered liquid dissolved solid particles (g/L) | | | | | | | | | | | | | |
|---|---|---|---|---|---|---|---|---|---|---|---|---|---|---|
| No. | Li | S | P | Ca | Mg | Na | B | Fe | Ni | Cr | K | Al | Mn | etc. |
| 1 | 36.00 | 84.58 | 2.41 | <0.003 | 0.006 | 0.153 | <0.003 | 0.005 | <0.003 | <0.003 | <0.003 | <0.003 | <0.003 | <0.003 |
| 2 | 36.20 | 86.61 | 2.54 | <0.003 | 0.006 | 0.159 | <0.003 | 0.005 | 0.003 | <0.003 | <0.003 | <0.003 | <0.003 | <0.003 |
| 3 | 36.57 | 86.58 | 2.43 | <0.003 | 0.005 | 0.151 | <0.003 | 0.005 | 0.003 | <0.003 | <0.003 | <0.003 | <0.003 | <0.003 |
| 4 | 35.61 | 85.06 | 2.45 | <0.003 | 0.004 | 0.143 | <0.003 | 0.006 | <0.003 | <0.003 | <0.003 | <0.003 | <0.003 | <0.003 |
| 5 | 34.86 | 83.54 | 1.97 | <0.003 | 0.004 | 0.122 | <0.003 | 0.006 | <0.003 | <0.003 | <0.003 | <0.003 | <0.003 | <0.003 |
| 6 | 34.82 | 83.04 | 2.18 | <0.003 | 0.004 | 0.145 | <0.003 | 0.008 | <0.003 | <0.003 | <0.003 | <0.003 | <0.003 | <0.003 |
| 7 | 33.77 | 80.03 | 1.99 | <0.003 | 0.008 | 0.14 | <0.003 | 0.008 | <0.003 | <0.003 | <0.003 | <0.003 | <0.003 | <0.003 |
| 8 | 33.96 | 80.42 | 1.9 | <0.003 | 0.008 | 0.133 | <0.003 | 0.008 | <0.003 | <0.003 | <0.003 | <0.003 | <0.003 | <0.003 |
| 9 | 33.92 | 80.76 | 2.04 | <0.003 | 0.008 | 0.136 | <0.003 | 0.007 | <0.003 | <0.003 | <0.003 | <0.003 | <0.003 | <0.003 |
| 10 | 34.01 | 80.3 | 1.85 | <0.003 | 0.008 | 0.121 | <0.003 | 0.006 | <0.003 | <0.003 | <0.003 | <0.003 | <0.003 | <0.003 |
| 11 | 33.87 | 80.51 | 2.54 | <0.003 | 0.008 | 0.16 | <0.003 | 0.009 | 0.003 | 0.003 | <0.003 | <0.003 | <0.003 | <0.003 |
| 12 | 34.2 | 81.32 | 2.06 | <0.003 | 0.008 | 0.136 | <0.003 | 0.007 | <0.003 | <0.003 | 0.004 | <0.003 | <0.003 | <0.003 |

The solid-liquid separation rate of the mixture was calculated from the result of analysis of the components of the filtrate, Recovered liquid dissolved solid particles, and dissolution liquid. In the initial mixture, P was calculated based on the main component of the liquid phase.

The P weight in the initial mixture was analyzed to be 12.086 to 12.649 kg, and the P weight in the recovered liquid dissolved solid particles was calculated as 0.312 to 0.209 kg considering the weight of P introduced from the solution.

According to the method for preparing lithium sulfate according to an embodiment of the present invention, the weight of P remaining in the recovered solid particles at the same time during filtration and washing was only 1.7 to 2.6% of the weight of P in the initial mixture. It is appeared that a solid-liquid separation rate was 97.4 to 98.3%. This can be seen in Table 14 below.

TABLE 14

| No. | Dissolution liquid amount (kg) | Recovery (L) | P Weight of mixture (kg) | P Amount of recovered liquid dissolved solid (kg) | P weight of Dissolution liquid (kg) | P weight of solid particle (kg) | P remaining ratio in solid particle (wt. %) | Solid-liquid separation ratio (%) |
|---|---|---|---|---|---|---|---|---|
| 1 | 125.5 | 132.6 | 12.302 | 0.320 | 0.050 | 0.270 | 2.2 | 97.8 |
| 2 | 125.5 | 132.5 | 12.578 | 0.336 | 0.050 | 0.287 | 2.3 | 97.7 |
| 3 | 130 | 136.2 | 12.649 | 0.331 | 0.051 | 0.280 | 2.2 | 97.8 |
| 4 | 130 | 136.5 | 12.486 | 0.334 | 0.051 | 0.283 | 2.3 | 97.7 |
| 5 | 130 | 137.9 | 12.273 | 0.272 | 0.051 | 0.220 | 1.8 | 98.2 |
| 6 | 135 | 141.6 | 12.391 | 0.309 | 0.053 | 0.255 | 2.1 | 97.9 |
| 7 | 135 | 141.5 | 12.276 | 0.282 | 0.053 | 0.228 | 1.9 | 98. |
| 8 | 135 | 141.5 | 12.158 | 0.269 | 0.053 | 0.216 | 1.8 | 98.2 |
| 9 | 135 | 141.5 | 12.404 | 0.289 | 0.053 | 0.235 | 1.9 | 98.1 |
| 10 | 135 | 141.6 | 12.102 | 0.262 | 0.053 | 0.209 | 1.7 | 98.3 |
| 11 | 135 | 143.7 | 12.086 | 0.365 | 0.053 | 0.312 | 2.6 | 97.4 |
| 12 | 135 | 143.4 | 12.182 | 0.295 | 0.053 | 0.242 | 2.0 | 98.0 |

It will be understood by those skilled in the art that various changes in form and details may be made therein without departing from the spirit and scope of the present invention as defined by the following claims and their equivalents. It will be understood that the invention may be embodied in other specific forms without departing from the spirit or scope of the invention. It is therefore to be understood that the embodiments and/or the examples described above are illustrative in all aspects and not restrictive.

DESCRIPTION OF SYMBOLS

100: reaction body 110: upper space
120: Lower space 200: Presser
300: stirrer 400: filter
500: recovery unit 600: cleaning liquid supply unit
610: first reservoir 620: first supply pipe
700: circulation unit 710: circulation pipe
800: dissolution liquid supply unit 810: second reservoir
820: second supply pipe 900: recovery unit
910: resultant pipe

The invention claimed is:

1. A device of manufacturing lithium sulfate comprising:
a reaction body in which a reaction of lithium phosphate and sulfuric acid is performed, the reaction body being divided into an upper space and a lower space;
a pressurizer for applying pressure to the inside of the reaction body;
a stirrer disposed in the upper space for stirring the lithium phosphate and sulfuric acid to produce a mixture containing lithium sulfate and phosphoric acid; and
a filter disposed inside the reaction body and separating the filtrate containing the phosphoric acid into the lower space by filtering the mixture.

2. The device of claim 1,
the device further comprises a recovery unit connected to the lower space and collecting the filtrate.

3. The device of claim 1,
the device further comprises:
a cleaning liquid supply unit connected to the upper space and supplying a cleaning liquid into the reaction body; and
a circulation unit for circulating the cleaning liquid passed through the filter from the lower space to the upper space.

4. The device of claim 3,
the device further comprises:
a dissolution liquid supply unit connected to the upper space and supplying a dissolution liquid into the reaction body; and
a obtaining unit for obtaining lithium sulfate dissolved in the dissolution liquid through a resultant pipe connected to the lower space.

5. The device of claim 4,
wherein, the cleaning liquid supply unit comprises:
a first reservoir in which the cleaning liquid is stored;
a first supply pipe communicating the first reservoir and the upper space; and
a spray nozzle formed at the end of the first supply pipe.

6. The device of claim 5,
wherein, the cleaning liquid supply unit further comprises:
a connection pipe connecting the resultant pipe and the first supply pipe; and
a connection pump installed on the connection pipe.

7. The device of claim 4,
wherein the dissolution liquid supply unit comprises:
a second reservoir for storing the dissolution liquid; and
a second supply pipe communicating the second reservoir and the upper space.

8. The device of claim 3,
The circulation unit comprises:
a circulation pipe communicating the lower space and the upper space; and
a circulation pump installed on the circulation pipe.

9. The device of claim 8,

The circulation unit further comprises:
a density measuring device installed in the circulation pipe and measuring a density of the cleaning liquid passing through the filter.

10. A method of manufacturing lithium sulfate comprising:
introducing solid phase lithium phosphate and sulfuric acid into a reaction vessel;
producing a mixture comprising solid lithium sulfate and phosphoric acid by stirring the solid lithium phosphate and sulfuric acid;
recovering a filtrate comprising the phosphoric acid by pressurizing and filtering the mixture; and
cleaning and filtering the mixture by spraying the cleaning liquid with the mixture being pressurized.

11. The method of claim 10,
wherein, in the step of spraying the cleaning liquid,
the mixture is cleaned and filtered at the same time.

12. The method of claim 10,
wherein, in the step of filtering the mixture,
when a liquid content which is the ratio of the liquid in the mixture is 45 to 53% by weight, the spray of the cleaning liquid is started.

13. The method of claim 12,
wherein, in the step of spraying the cleaning liquid,
the cleaning liquid is sprayed so that the liquid content of the mixture is maintained at 45 to 53% by weight.

14. The method of claim 10,
in the step of filtering the mixture, the mixture is pressurized to 2 to 4 bar, and
in the step of spraying the cleaning liquid, the mixture is pressurized to 2 to 4 bar.

15. The method of claim 10, further comprises:
determining that the mixture has been washed by measuring the density of the filtrate filtered from the mixture, if the density of the filtrate becomes 1.51 g/cc or less, after the step of spraying the cleaning liquid.

16. The method of claim 15, further comprises:
terminating the spraying of the cleaning liquid when the density of the filtrate becomes 1.25 g/cc or less, after the step of measuring the density of the filtrate.

17. The method of claim 10, further comprises:
supplying a dissolution liquid to the remained solid lithium sulfate filtered the filtrate from the mixture; and
obtaining lithium sulfate dissolved in the dissolution liquid, after the step of spraying the cleaning liquid.

18. The method of claim 10,
in the step of filtering the mixture,
the total concentration of phosphorus (P) and sulfur (S) in the filtrate is 5 mol/L or more.

19. The method of claim 10,
in the step of producing the mixture,
the mixture is produced through direct reaction of the solid lithium phosphate and sulfuric acid,
the mixture comprises a phosphoric acid solution in which sulfuric acid ions are present, and
the solid lithium sulfate is precipitated in the phosphoric acid solution.

20. The method of claim 10,
in the step of spraying the cleaning liquid,
wherein the total weight of the cleaning liquid to be sprayed is 0.9 to 1.2 times the weight of the solid phase particles contained in the mixture before spraying the cleaning liquid.

* * * * *